(12) United States Patent
Lee et al.

(10) Patent No.: US 11,681,391 B2
(45) Date of Patent: Jun. 20, 2023

(54) DISPLAY DEVICE AND METHOD OF DRIVING THE SAME

(71) Applicant: Samsung Display Co., Ltd., Yongin-Si (KR)

(72) Inventors: Il Ho Lee, Hwaseong-si (KR); Sanghun Park, Cheonan-si (KR); Jihoon Kim, Suwon-si (KR); Yongsub So, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/401,695

(22) Filed: Aug. 13, 2021

(65) Prior Publication Data

US 2022/0164083 A1 May 26, 2022

(30) Foreign Application Priority Data

Nov. 23, 2020 (KR) ........................ 10-2020-0157971

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05)

(58) Field of Classification Search
CPC ... G06F 3/04164; G06F 3/0446; G06F 3/0412
See application file for complete search history.

(56) References Cited

U.S. PATENT DOCUMENTS

| 9,804,704 | B2 | 10/2017 | Azumi et al. |
| 10,394,407 | B2 | 8/2019 | Lee et al. |
| 2015/0242022 | A1* | 8/2015 | Hung .................... G06F 3/0446 |
| | | | 345/174 |
| 2016/0306465 | A1* | 10/2016 | Ahn ..................... G06F 3/04166 |
| 2019/0363137 | A1* | 11/2019 | Feng .................... H01L 51/0018 |
| 2020/0125194 | A1 | 4/2020 | Jiang et al. |

FOREIGN PATENT DOCUMENTS

KR 10-1651733 8/2016

* cited by examiner

*Primary Examiner* — Peter D McLoone
(74) *Attorney, Agent, or Firm* — F. Chau & Associates, LLC

(57) ABSTRACT

A display device includes a display panel configured to display an image, an input sensor disposed on the display panel to sense an input and including a first area and a second area, and a sensor controller connected to the input sensor. The input sensor includes first sensing electrodes disposed in the first area, second sensing electrodes disposed in the second area, and a boundary sensing electrode disposed to overlap a boundary between the first and second areas. The boundary sensing electrode forms a mutual capacitor with one or more of the first sensing electrodes that are adjacent to the boundary sensing electrode, and forms a mutual capacitor with one or more of the second sensing electrodes that are adjacent to the boundary sensing electrode.

18 Claims, 19 Drawing Sheets

DISPLAY DEVICE AND METHOD OF DRIVING THE SAME

CROSS-REFERENCE TO RELATED APPLICATION

This U.S. non-provisional patent application claims priority under 35 U.S.C. § 119 to Korean Patent Application No. 10-2020-0157971, filed on Nov. 23, 2020, the disclosure of which is incorporated by reference herein in its entirety.

TECHNICAL FIELD

The present disclosure relates to a display device and a method of driving the same. More particularly, the present disclosure relates to a display device with improved sensing performance and a method of driving the same.

DISCUSSION OF THE RELATED ART

Multimedia electronic devices, such as televisions, mobile phones, tablet computers, navigation units, and game units, often include a display device to display images. In some cases, the electronic devices include an input sensor that provides a touch-based input method to alloy users to easily and intuitively input information or commands in addition to the usual input methods, such as a button, a keyboard, a mouse, etc.

A conventional input sensor may be configured to sense a touch or pressure generated from a part of a user's body, such as their finger. However, in some conventional display devices, especially those with relatively large display screens, there may be decreased multi-touch sensitivity at the boundaries of the display area.

SUMMARY

The present disclosure provides a display device capable of improving sensing sensitivity in a boundary area of a structure in which two or more sensor control circuits are connected to an input sensor.

The present disclosure provides a method of driving the display device.

Embodiments of the inventive concept provide a display device including a display panel configured to display an image, an input sensor disposed on the display panel to sense an input and including a first area and a second area, and a sensor controller connected to the input sensor.

The input sensor includes first sensing electrodes disposed in the first area, second sensing electrodes disposed in the second area, and a boundary sensing electrode disposed to overlap a boundary between the first and second areas.

The boundary sensing electrode forms a mutual capacitor with one or more of the first sensing electrodes and forms a mutual capacitor with one or more of the second sensing electrodes.

Embodiments of the inventive concept provide a method of driving a display device including a display panel configured to display an image, an input sensor disposed on the display panel to sense an input, and first and second sensor control circuits connected to the input sensor.

The method includes driving first sensing electrodes disposed in a first area of the input sensor using the first sensor control circuit and driving second sensing electrodes disposed in a second area of the input sensor using the second sensor control circuit to generate a first sensing result with respect to the input in a first mode. The method includes driving a boundary sensing electrode disposed to overlap a boundary between the first and second areas of the input sensor, one or more of the first sensing electrodes adjacent to the boundary sensing electrode, and one or more of the second sensing electrodes adjacent to the boundary sensing electrode to generate a second sensing result with respect to the input in a second mode. The method includes combining the sensing result in the first mode and the sensing result in the second mode to obtain a final sensing result.

According to the above, the input sensor senses the input occurring in the boundary by two sensing methods, i.e., a self-capacitance method and a mutual capacitance method, using the boundary sensing electrode disposed in the boundary between the first area and the second area. Thus, the sensing characteristics of the input sensor in the boundary is improved.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

Figure 1:
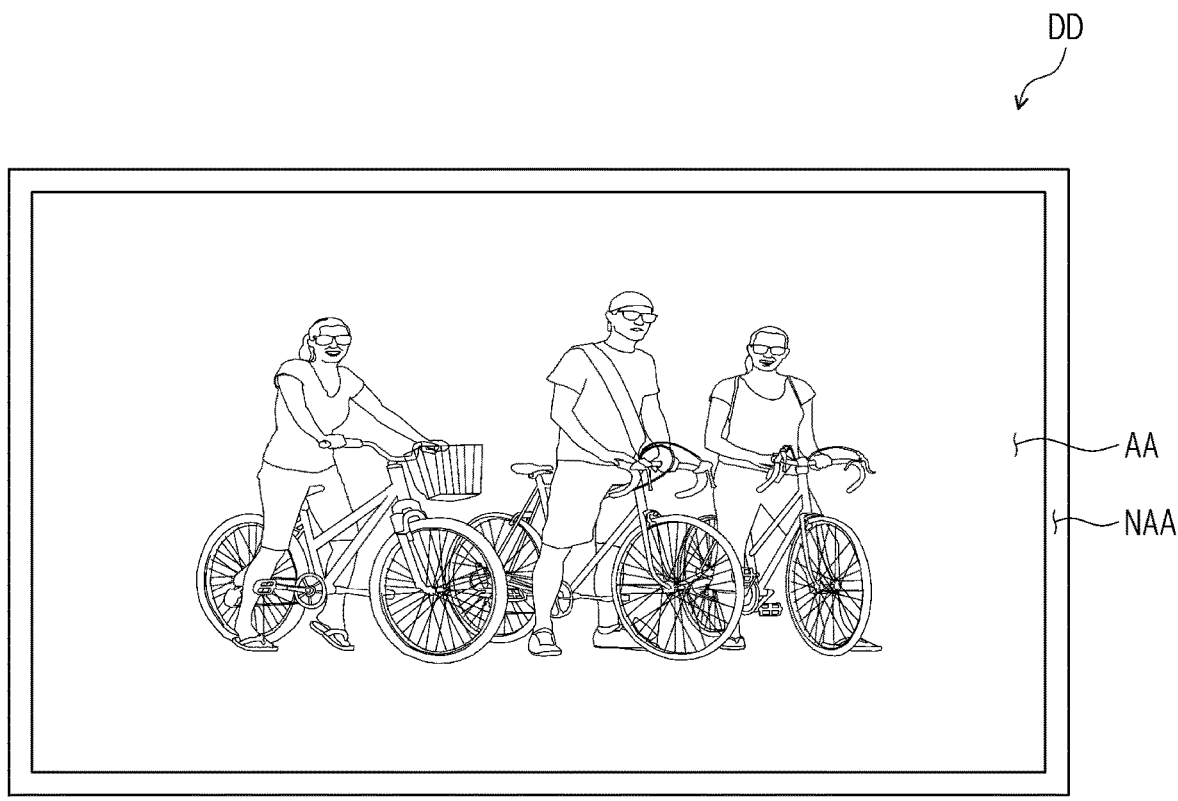
FIG. 1 is a plan view of a display device according to an embodiment of the present disclosure.

In the present disclosure, it will be understood that when an element or layer is referred to as being "on", "connected to" or "coupled to" another element or layer, it may be directly on, connected or coupled to the other element or layer or intervening elements or layers may be present.

Like numerals may refer to like elements throughout. In the drawings, the thickness, ratio, and dimension of components may be exaggerated for effective description of the technical content.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, sunless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device illustrated in the figures is turned over, elements described as "below" or "beneath" other elements or features may then be oriented "above" the other elements or features. Thus, the exemplary term "below" can encompass both an orientation of above and below. The device may be other otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In the present description, "when viewed on a plane" or "in a plan view" may refer to as being viewed from or as so viewed from a vertical (e.g., "Z") direction. When something is described in connection to "the outside", it may refer to anything that is external to the currently described embodiment. Furthermore, description of singular elements may be applied to a plurality of those same elements, unless otherwise indicated by context.

Hereinafter, the present disclosure will be explained in detail with reference to the accompanying drawings.

Figure 2:
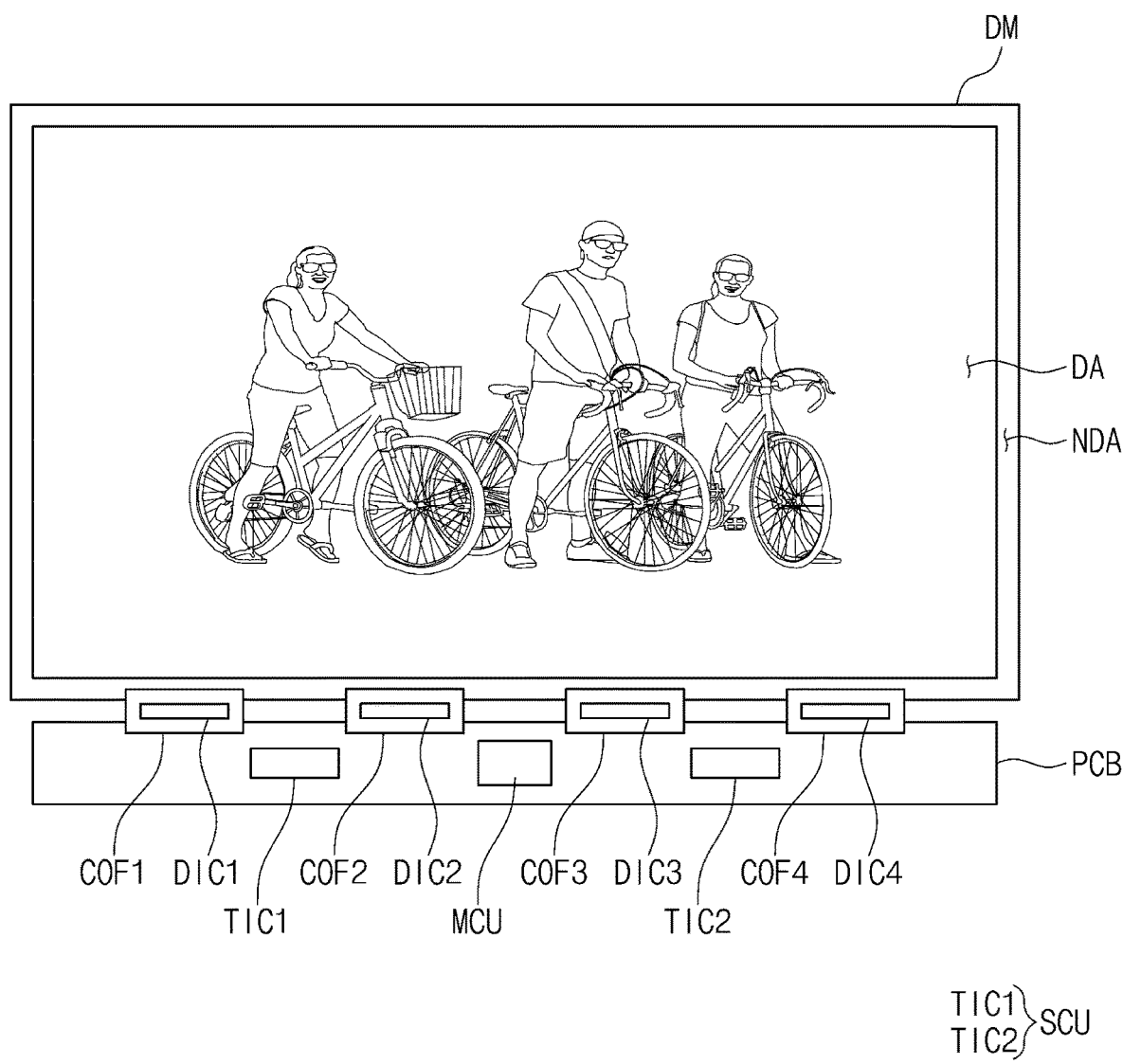
FIG. 2 is a plan view of a display module according to an embodiment of the present disclosure.
Figure 3:
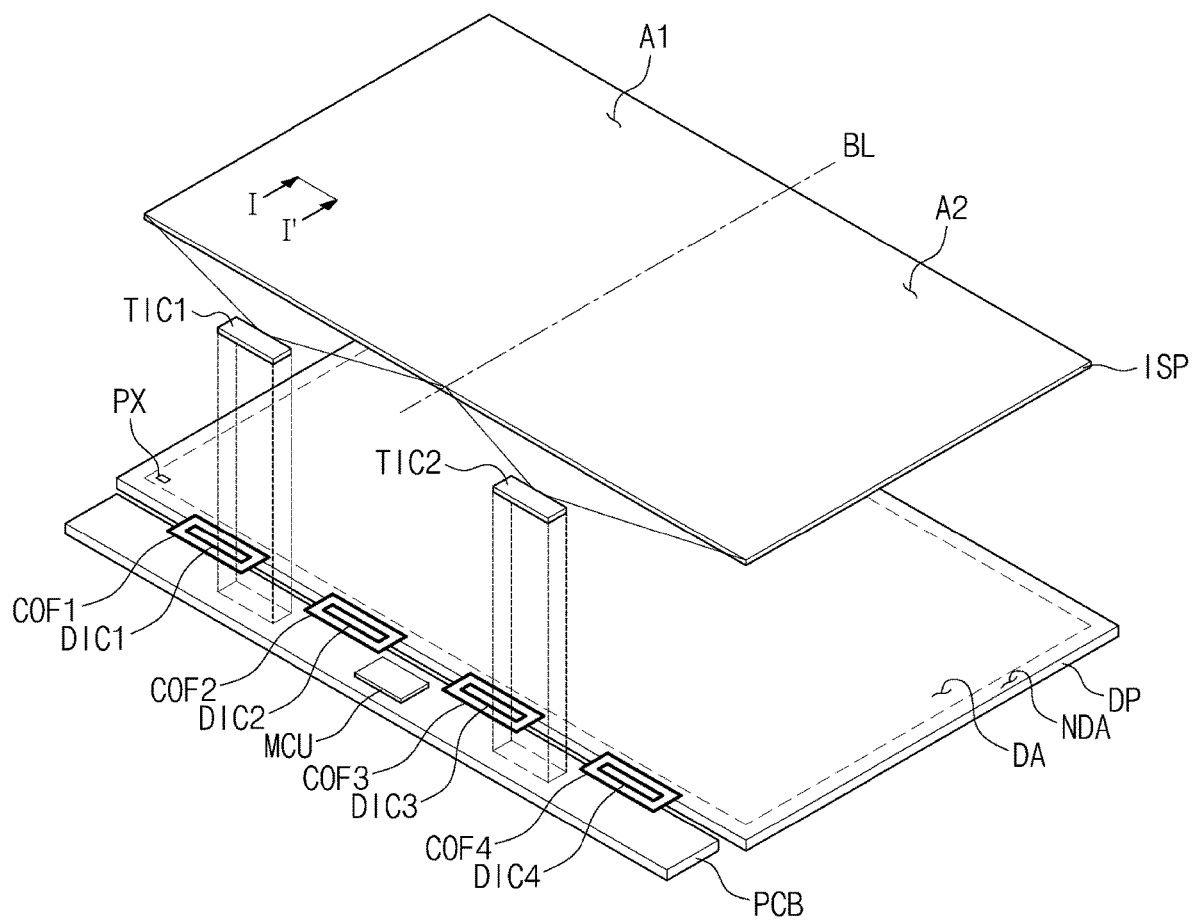
FIG. 3 is an exploded perspective view of the display module shown in FIG. 2.

FIG. 1 is a plan view of a display device DD according to an embodiment of the present disclosure, and FIG. 2 is a plan view of a display module DM according to an embodiment of the present disclosure. FIG. 3 is an exploded perspective view of the display module DM shown in FIG. 2.

Referring to FIGS. 1 to 3, the display device DD may be activated in response to electrical signals. The display device DD may be a mobile phone, a tablet computer, a computer, a car navigation unit, a game unit, or a wearable device, or the like. However, the display device DD is not particularly limited.

The display device DD may include an active area AA and a peripheral area NAA, which are defined in the display device DD. The display device DD may display an image through the active area AA. The active area AA may include a surface parallel to a first direction DR1 and a second direction DR2. The peripheral area NAA may laterally surround the active area AA.

The display device DD shown in FIG. 1 may sense an input generated by a user's body or an input generated by an input device. The input device may refer to a device other than the user's body. For example, the input device may be an active pen, a stylus pen, a touch pen, an electronic pen, or the like. The input generated by the user's body may include various forms of external inputs, such as a touch by a portion of the user's body, heat, or pressure.

The display device DD may include a display module DM. The display module DM may include a display panel DP and an input sensor ISP.

The display panel DP may be configured to generate the image. The display panel DP may be a light emitting type display panel. For example, the display panel DP may be an organic light emitting display panel, a quantum dot display panel, a micro-LED display panel, or a nano-LED display panel.

The display panel DP may include a display area DA configured to display the image and a non-display area NDA adjacent to the display area DA. The display area DA may be an area in which the image is substantially displayed, and the non-display area NDA may be a bezel area in which the image is not displayed. FIG. 1 shows a structure in which the non-display area NDA laterally surrounds the display area DA, however, the present disclosure is not necessarily limited thereto. The non-display area NDA may be disposed at at least one side of the display area DA. The image may be displayed in the display area DA. The image may be a dynamic image (e.g., video and/or an interface) or a still image.

The display panel DP may include a plurality of pixels PX and signal lines connected to the pixels PX. Each of the pixels PX may include a light emitting element. The signal lines may include data lines, scan lines, and power lines.

The input sensor ISP may be disposed on the display panel DP. The input sensor ISP may sense an input applied thereto from the outside. As an example, the input sensor ISP may be disposed to substantially overlap the display area DA in a thickness direction (e.g., a third direction DR3). The input sensor ISP may include a plurality of areas. FIG. 3 shows a structure in which the input sensor ISP is divided into two areas by an imaginary boundary line BL as a representative example, however, the number of the areas defined in the input sensor ISP is not necessarily limited to these two. Hereinafter, the two areas will be referred to as a first area A1 and a second area A2. The first and second areas A1 and A2 may be adjacent to each other in the first direction DR1.

The display device DD may further include a plurality of data driving chips DIC1 through DIC4, a plurality of flexible films COF1 through COF4, and a printed circuit board PCB.

The flexible films COF1 through COF4 may be disposed between the display panel DP and the printed circuit board PCB and may electrically connect the display panel DP to the printed circuit board PCB. One end of each of the flexible films COF1 through COF4 may be coupled to the display panel DP, and the other end of each of the flexible films COF1 through COF4 may be coupled to the printed circuit board PCB.

FIG. 2 shows a structure in which the data driving chips DIC1 through DIC4 are mounted on the flexible films COF1 through COF4, respectively, however, the present disclosure is not necessarily limited thereto. For example, the data driving chips DIC1 through DIC4 may be directly mounted on the display panel DP in a chip-on-glass (COG) method.

Various circuits that generate a variety of control signals and a power signal required to drive the display panel DP and the data driving chips DIC1 through DIC4 may be provided on the printed circuit board PCB. As an example, a main controller MCU may be mounted on the printed circuit board PCB to control an overall operation of the display device DD. The main controller MCU may include at least one microprocessor, and the main controller MCU may be referred to as a host. The main controller MCU may further include a graphics controller.

The display device DD may further include a sensor controller SCU to control driving of the input sensor ISP. As an example, the sensor controller SCU may include a first sensor control circuit TIC1 and a second sensor control circuit TIC2. In detail, the first sensor control circuit TIC1 may control driving of the first area A1 of the input sensor ISP, and the second sensor control circuit TIC2 may control driving of the second area A2 of the input sensor ISP. Each of the first and second sensor control circuits TIC1 and TIC2 may be implemented in a chip form and may be mounted on the printed circuit board PCB.

The sensor controller SCU may receive a sensing control signal from the main controller MCU. The sensing control signal may include a mode determination signal, which determines a driving mode of the sensor controller SCU, and a clock signal. The sensor controller SCU may control the input sensor ISP to operate the input sensor ISP in a first mode or a second mode in response to the mode determination signal.

The sensor controller SCU may calculate coordinate information of a user input based on signals applied thereto from the input sensor ISP, and may output a coordinate signal having the coordinate information to the main controller MCU. The main controller MCU may perform an operation corresponding to the input based on the coordinate signal. For ample, the main controller MCU may control the operation of the display panel DP such that new images are displayed through the display panel DP based on the coordinate signal. For example, the main controller MCU may facilitate an interactive user interface by controlling the display panel DP responsive to user input.

Figure 4:
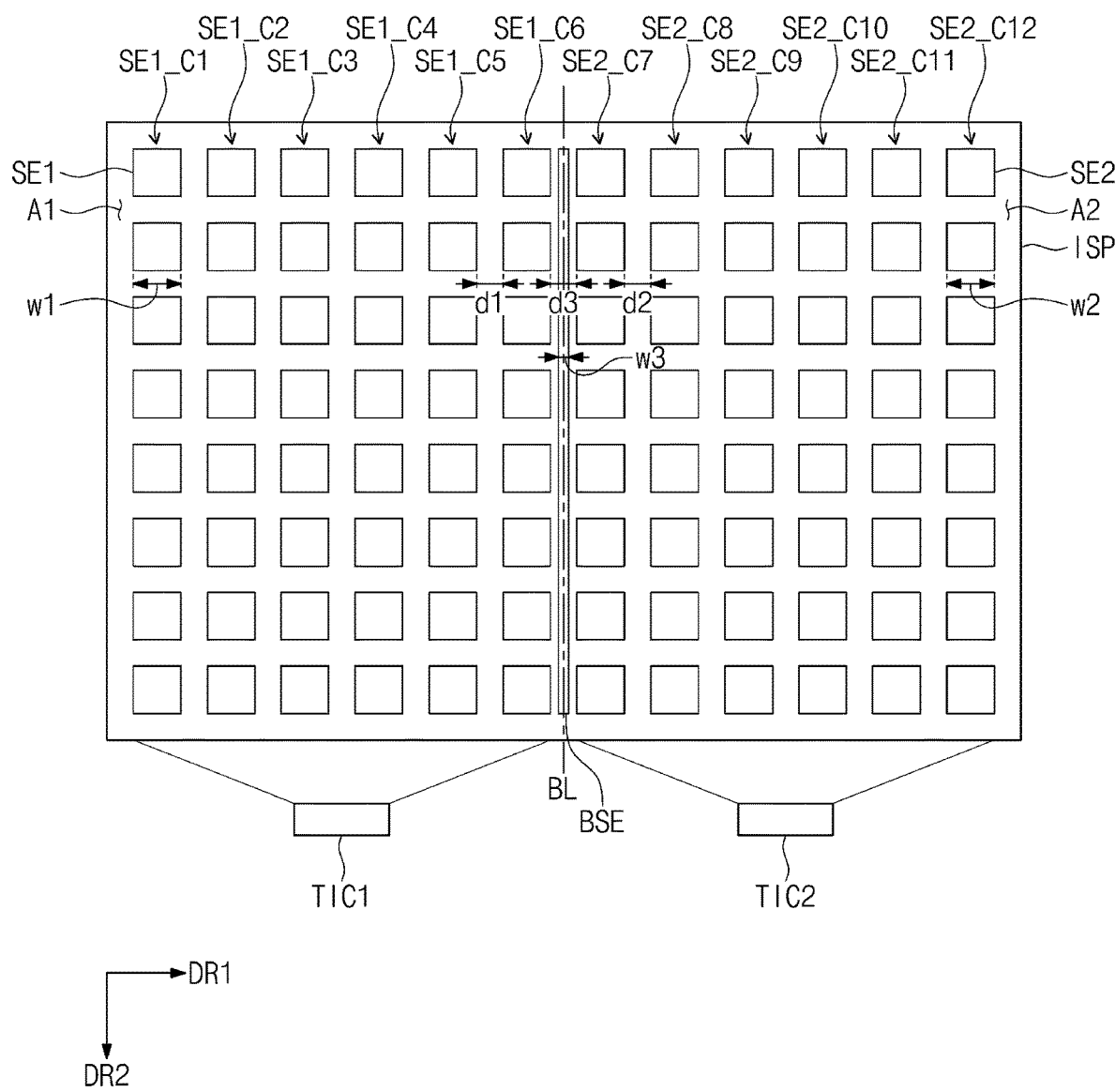
FIG. 4 is a plan view of an input sensor according to an embodiment of the present disclosure.
Figure 5:
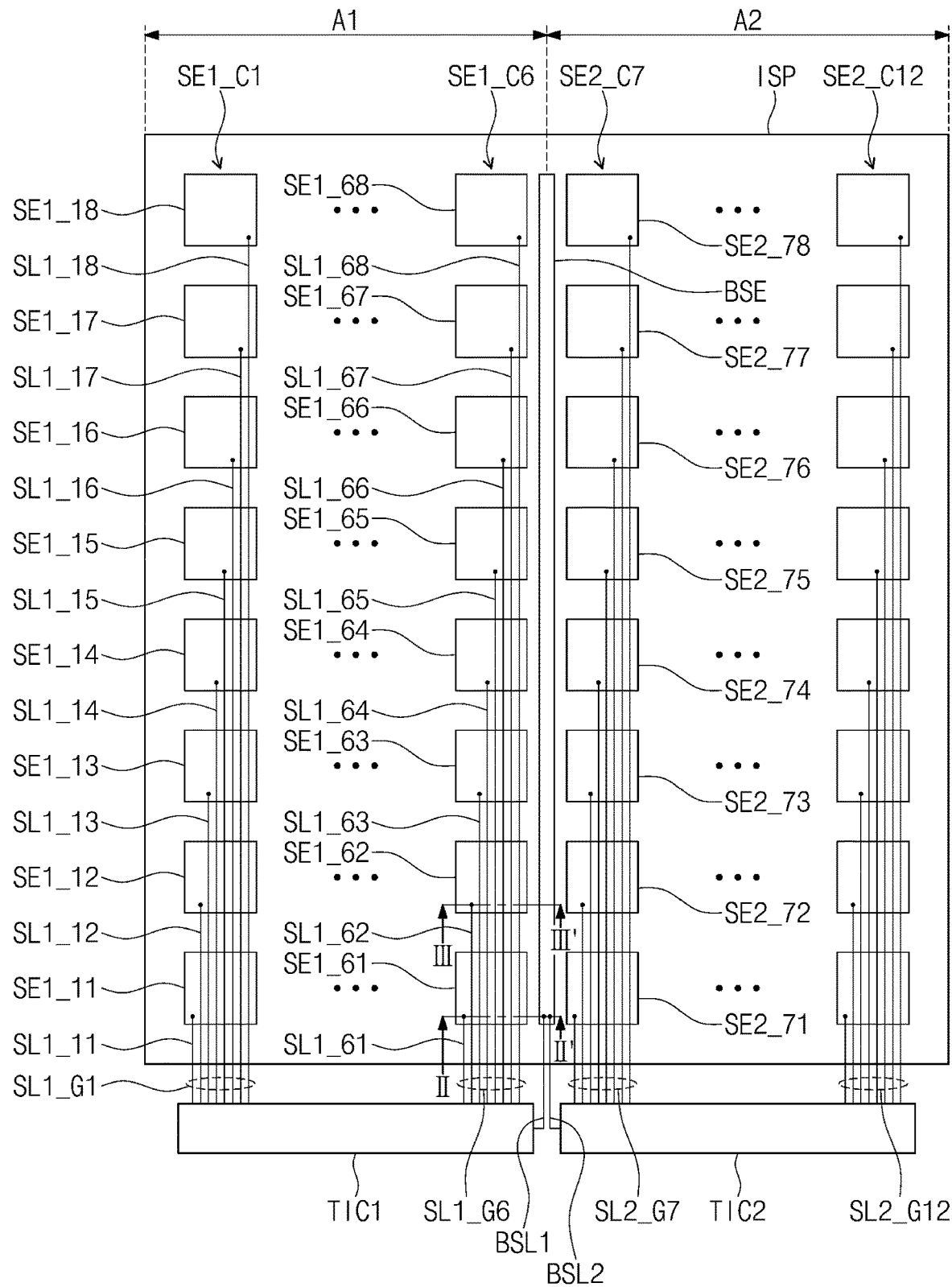
FIG. 5 is a view showing a connection between an input sensor and first and second sensor control circuits according to an embodiment of the present disclosure.

FIG. 4 is a plan view of the input sensor ISP according to an embodiment of the present disclosure, and FIG. 5 is a view showing a connection relation between the input sensor ISP and the first and second sensor control circuits TIC1 and TIC2 according to an embodiment of the present disclosure.

Referring to FIG. 4, the input sensor ISP may include first sensing electrodes SE1 disposed in the first area A1, second sensing electrodes SE2 disposed in the second area A2, and a boundary sensing electrode BSE which overlaps a boundary between the first area A1 and the second area A2. The boundary sensing electrode BSE may be disposed in the boundary between the first and second areas A1 and A2, and may partially overlap the first area A1 and the second area A2.

Each of the first sensing electrodes SE1 may have its own coordinate information. The first sensing electrodes SE1 may be arranged in a matrix pattern in the first area A1. For example, the first sensing electrodes SE1 may have rows extending in a first direction D1, and columns extending in a second direction D2. When the first and second directions DR1 and DR2 are respectively referred to as a row direction and a column direction, a group of the first sensing electrodes SE1 arranged in the same column may be defined as a sensing electrode column. The sensing electrode column may be provided in plural, the sensing electrode columns may be disposed in the first area A1 of the input sensor ISP, and each of the sensing electrode columns may include a plurality of first sensing electrodes arranged in the second direction DR2. FIG. 4 shows a structure in which six sensing electrode columns are disposed in the first area A1 of the input sensor ISP and eight first sensing electrodes SE1 are included in each sensing electrode column, however, this is merely one example, and the arrangement and the number of the first sensing electrodes SE1 disposed in the first area A1 are not necessarily limited thereto. Hereinafter, for the convenience of explanation, the first through sixth sensing electrode columns of the first area A1 may be respectively referred to as first, second, third, fourth, fifth, and sixth sensing electrode columns SE1_C1, SE1_C2, SE_C3, SE_C4, SE1_C5, and SE1_C6.

Each of the first sensing electrodes SE1 may have a polygonal shape. In FIG. 4, each of the first sensing electrodes SE1 has a quadrangular shape, however, the shape of each of the first sensing electrodes SE1 is not necessarily limited thereto.

Similarly, each of the second sensing electrodes SE2 may have its own coordinate information. The second sensing electrodes SE2 may be arranged in a matrix pattern in the second area A2. For example, the second sensing electrodes SE2 may have rows extending in the first direction D1, and columns extending in the second direction D2. A group of the second sensing electrodes SE2 arranged in the same column may be defined as a sensing electrode column. The sensing electrode column may be provided in plural, the sensing electrode columns may be disposed in the second area A2 of the input sensor ISP, and each of the sensing electrode columns may include a plurality of second sensing electrodes arranged in the second direction DR2. FIG. 4 shows a structure in which six sensing electrode columns are disposed in the second area A2 of the input sensor ISP and eight second sensing electrodes SE2 are included in each sensing electrode column, however, this is merely one example, and the arrangement and the number of the second sensing electrodes SE2 disposed in the second area A2 are not necessarily limited thereto. Hereinafter, the first through sixth sensing electrode columns of the second area A2 may be respectively referred to as seventh, eighth, ninth, tenth, eleventh, and twelfth sensing electrode columns SE2_C7, SE2_C8, SE2_C9, SE2_C10, SE2_C11, and SE2_C12.

Each of the second sensing electrodes SE2 may have a polygonal shape. Each of the second sensing electrodes SE2 may have substantially the same shape and size as those of each of the first sensing electrodes SE1. In FIG. 4, each of the second sensing electrodes SE2 has a quadrangular shape, however, the shape of each of the second sensing electrodes SE2 is not necessarily limited thereto.

The boundary sensing electrode BSE may be disposed at a position which at least partially overlaps the imaginary boundary line BL defined in the boundary between the first area A1 and the second area A2. In particular, the boundary sensing electrode BSE may be disposed adjacent to a portion of the first sensing electrodes SE1 which are adjacent to the boundary line BL among the first sensing electrodes SE1 of the first area A1, e.g., the sixth sensing electrode column SE1_C6. The boundary sensing electrode BSE may be disposed adjacent to a portion of the second sensing electrodes SE2 adjacent to the boundary line BL among the second sensing electrodes SE2 of the second area A2, e.g, the seventh sensing electrode column SE2_C7. The boundary sensing electrode BSE may extend in a direction substantially parallel to the boundary line BL, i.e., the second direction DR2. The boundary sensing electrode BSE may be substantially parallel to the sixth sensing electrode column SE1_C6 and the seventh sensing electrode column SE2_C7.

The boundary sensing electrode BSE may form a mutual capacitor with some of the first sensing electrodes SE1. For example, the boundary sensing electrode BSE may form a mutual capacitor with the first sensing electrodes SE1 of the sixth sensing electrode column SE1_C6. The boundary sensing electrode BSE may also form a mutual capacitor with some of the second sensing electrodes SE2, e.g., the second sensing electrodes SE2 of the seventh sensing electrode column SE2_C7.

Each of the first sensing electrodes SE1 may have a first width w1 in the first direction DR1, and each of the second sensing electrodes SE2 may have a second width w2 in the first direction DR1. The first width w1 and the second width w2 may be substantially the same as each other. The boundary sensing electrode BSE may have a third width w3 in the first direction DR1. The third width w3 may be smaller than the first and second widths w1 and w2.

The first sensing electrodes SE1 may each be spaced apart from each other by a first distance d1 in the first direction DR1. The second sensing electrodes SE2 may each be spaced apart from each other by a second distance d2 in the first direction DR1. The first distance d1 and the second distance d2 may be substantially the same as each other. The third width w3 of the boundary sensing electrode BSE may be smaller than the first and second distances d1 and d2. The sixth sensing electrode column SE1_C6 and the seventh sensing electrode column SE2_C7 may be spaced apart from each other at a third distance d3 in the first direction DR1 The third distance d3 may be equal to or greater than the first and second distances d1 and d2, though the present disclosure is not necessarily limited thereto.

The sensor controller SCU may include the first sensor control circuit TIC1 electrically connected to the first sensing electrodes SE1 and the second sensor control circuit TIC2 electrically connected to the second sensing electrodes SE2. In this case, the first area A1 may be defined as an area in which the first sensing electrodes SE1 electrically connected to the first sensor control circuit TIC1 are disposed, and the second area A2 may be defined as an area in which the second sensing electrodes SE2 electrically connected to the second sensor control circuit TIC2 are disposed.

When the number of the sensor control circuits included in the sensor controller SCU increases, the number of the areas defined in the input sensor ISP may also increase. For example, in some embodiments, the number of areas defined in the input sensor ISP may match the number of sensor control circuits in the sensor controller SCU. For example, in a case where the number of the sensor control circuits included in the sensor controller SCU is three, the input sensor ISP may further include a third area in addition to the first and second areas A1 and A2. In this case, the input sensor ISP may further include a boundary sensing electrode disposed in a boundary between the second area A2 and the third area in addition to the boundary sensing electrode BSE disposed in the boundary between the first and second areas A1 and A2. When the number of the areas increases in different embodiments, the number of the boundary sensing electrodes may increase to correspond to the number of the areas. For example, embodiments that have N number of areas may have N−1 boundary sensing electrodes. For the convenience of explanation, the case in which the input sensor ISP includes two areas A1 and A2 will be described as a representative example in FIGS. 4 to 10.

Referring to FIGS. 4 and 5, the input sensor ISP may include first sensing lines disposed in the first area A1 and second sensing lines disposed in the second area A2. The first sensing lines may electrically connect the first sensing electrodes SE1 to the first sensor control circuit TIC1, and the second sensing lines may electrically connect the second sensing electrodes SE2 to the second sensor control circuit TIC2. The first sensing lines may be grouped, such that the number of first sensing line groups corresponds to the number of the sensing electrode columns. As an example, the first sensing lines may be grouped into first, second, third, fourth, fifth, and sixth line groups SL1_G1 through SL1_G6 respectively corresponding to the first to sixth sensing electrode columns SE1_C1 through SE1_C6. Each of the first through sixth line groups SL1_G1 through SL1_G6 may include a number of first sensing lines which corresponds to the number of the first sensing electrodes STA in a sensing electrode column. As an example, each of the first to sixth line groups SL1_G1 to SL1_G6 may include eight first sensing lines. The first sensing lines in each of the first through sixth line groups SL1_G1 through SL1_G6 may be electrically connected to the first sensing electrodes included in a corresponding sensing electrode column, respectively.

The first line group SL1_G1 may include first sensing lines SL1_11 to SL1_18 electrically connected to first sensing electrodes SE1_11 to SE1_18 included in the first sensing electrode column SE1_C1. The sixth line group SL1_G6 may include first sensing lines SL1_61 to SL1_68 electrically connected to first sensing electrodes SE1_61 to SE1_68 included in the sixth sensing electrode column SE1_C6. Each of the first sensing lines SL1_11 to SL1_18 may overlap at least one first sensing electrodes SE1_11 to SE1_18. For example, among the first sensing lines SL1_11 to SL1_18, the first sensing line SL1_11 may overlap only one first sensing electrode SE1_11, while the first sensing line SL1_18 may overlap eight first sensing electrodes SE_11 to SE1_18. As described above, when the first sensing lines SL1_11 to SL1_68 of each of the line groups SL1_G1 to SL1_G6 are each disposed to overlap its corresponding sensing electrode column, distances between sensing electrode columns SE1_C1 to SE1_C6 may be reduced. For example, distances between the sensing electrode columns SE1_C1 to SE1_C6 may be reduced compared to a structure in which sensing lines are disposed between the sensing electrode columns SE1_C1 to SE1_C6. Accordingly, the increase of the non-effective sensing area in the input sensor ISP due to the sensing lines may be prevented, and the non-effective sensing area may be minimized.

The second sensing lines may be grouped into seventh through twelfth line groups SL2_G7 through SL2_G12 respectively corresponding to the seventh through twelfth sensing electrode columns SE2_C7 through SE2_C12. Each of the seventh to twelfth line groups SL2_G7 to SL2_G12 may have a number of sensing lines which corresponds to the number of the second sensing electrodes SE2 included in each of the seventh to twelfth sensing electrode columns SE2_C7 to SE2_C12. For example, each of the seventh to twelfth line groups SL2_G7 to SL2_G12 may include eight second sensing lines. The second sensing lines of each of the seventh to twelfth line groups SL2_G7 to SL2_G12 may be electrically connected to the second sensing electrodes included in the corresponding sensing electrode column, respectively. The connection relation between the second sensing lines of each of the seventh to twelfth line groups SL2_G7 to SL2_G12 and the second sensing electrodes included in the corresponding sensing electrode column may be similar to the connection relation between the first sensing lines and the first sensing electrodes, and thus, details thereof will be omitted.

The input sensor ISP may further include first and second boundary sensing lines BSL1 and BSL2 electrically connected to the boundary sensing electrode BSE. The first boundary sensing line BSL1 may electrically connect the boundary sensing electrode BSE to the first sensor control circuit TIC1, and the second boundary sensing line BSL2 may electrically connect the boundary sensing electrode BSE to the second sensor control circuit TIC2. For example, the boundary sensing electrode BSE may be commonly connected to the first and second sensor control circuits TIC1 and TIC2 through the first and second boundary sensing lines BSL1 and BSL2. The boundary sensing electrode BSE may not overlap the first and second sensing lines.

The input sensor ISP may operate in multiple modes, including the first mode and the second mode. In the first mode, the first sensor control circuit TIC1 may drive the first sensing electrodes SE1 to sense the input in the first area A1, and the second sensor control circuit TIC2 may drive the second sensing electrodes SE2 to sense the input in the second area A2. For example, the input sensor ISP may sense the input by a self-capacitance method in the first mode. In the first mode, the first sensor control circuit TIC1 may receive first self-sensing signals from the first sensing electrodes SE1. The first sensor control circuit TIC1 may obtain a first self-sensing result with respect to the input by from the first self-sensing signals. In the first mode, the second sensor control circuit TIC2 may receive second self-sensing signals from the second sensing electrodes SE2. The second sensor control circuit TIC2 may obtain a second self-sensing result with respect to the input by from the second self-sensing signals.

In the first mode, at least one of the first and second sensor control circuits TIC1 and TIC2 may apply a compensation signal to the boundary sensing electrode BSE. The compensation signal may have substantially the same phase as a first driving signal applied to the first sensing electrodes SE1 by the first sensor control circuit TIC1, and/or as a second driving signal applied to the second sensing electrodes SIF by the second sensor control circuit TIC2. Accordingly, interferences between the boundary sensing electrode BSE and the first sensing electrodes SE1 as well as interferences between the boundary sensing electrode BSE and the second sensing electrodes SE2 may be reduced in the first mode.

In the second mode, the first sensor control circuit TIC1 may drive some of the first sensing electrodes SE1 and the boundary sensing electrode BSE to sense the input in and around the boundary of the first and second areas A1 and A2. In addition, in the second mode, the second sensor control circuit TIC2 may drive some of the second sensing electrodes SE2 and the boundary sensing electrode BSE to sense the input in and around the boundary of the first and second areas A1 and A2. As an example, some of the first sensing electrodes SE1 driven in the second mode may be the first sensing electrodes SE1_61 through SE1_68 included in the sixth sensing electrode column SE1_C6 disposed adjacent to the boundary of the first and second areas A1 and A2. Additionally or alternatively, some of the second sensing electrodes SE2 driven in the second mode may be the second sensing electrodes SE2_71 through SE2_78 included in the seventh sensing electrode column SE2_C7 disposed adjacent to the boundary of the first and second areas A1 and A2.

Hereinafter, the operation in the second mode will be described in detail with reference to accompanying drawings.

Figure 6A:
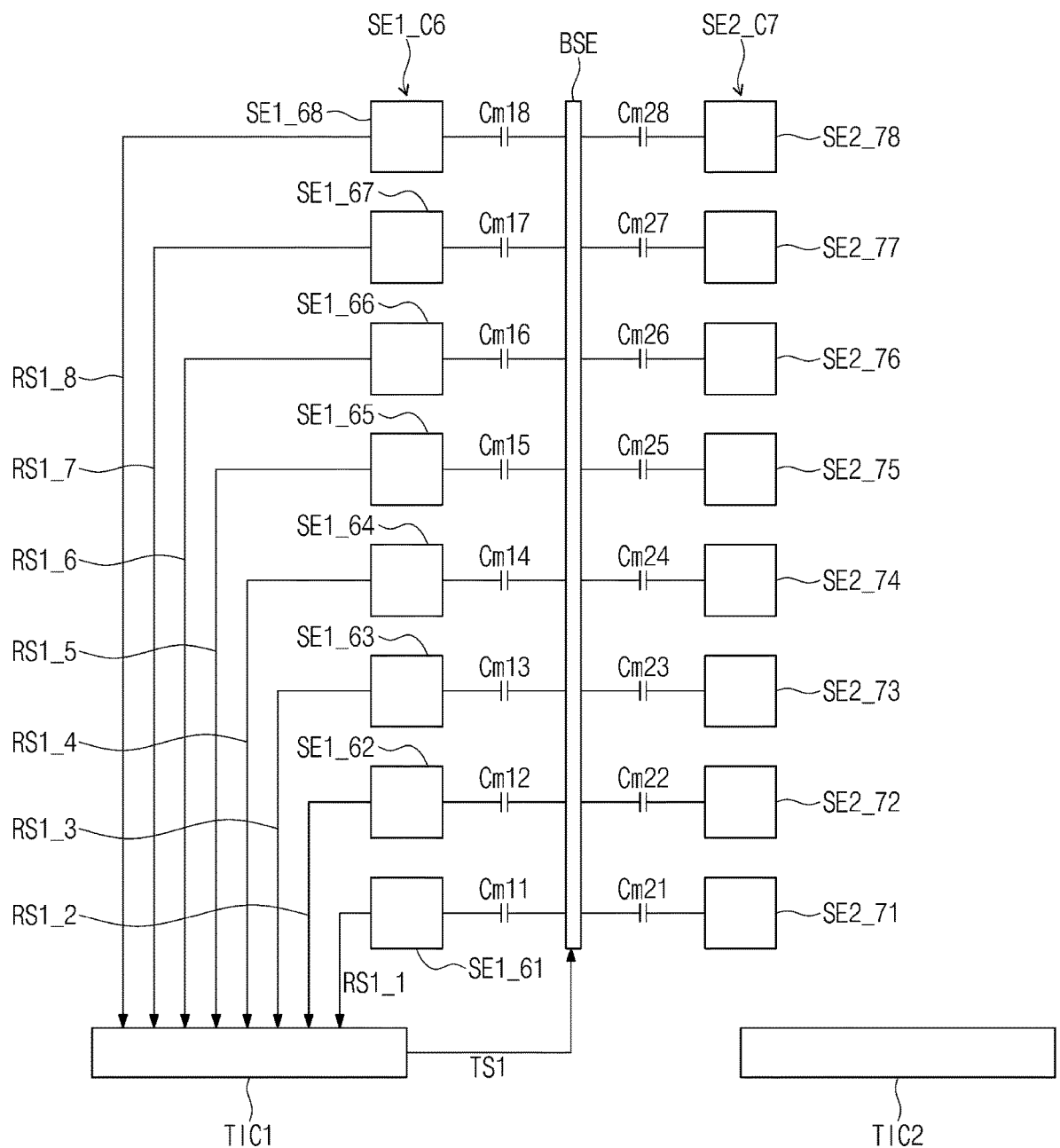
FIGS. 6A and 6B are views showing an operation of an input sensor and first and second sensor control circuits in a second mode according to an embodiment of the present disclosure.
Figure 6B:
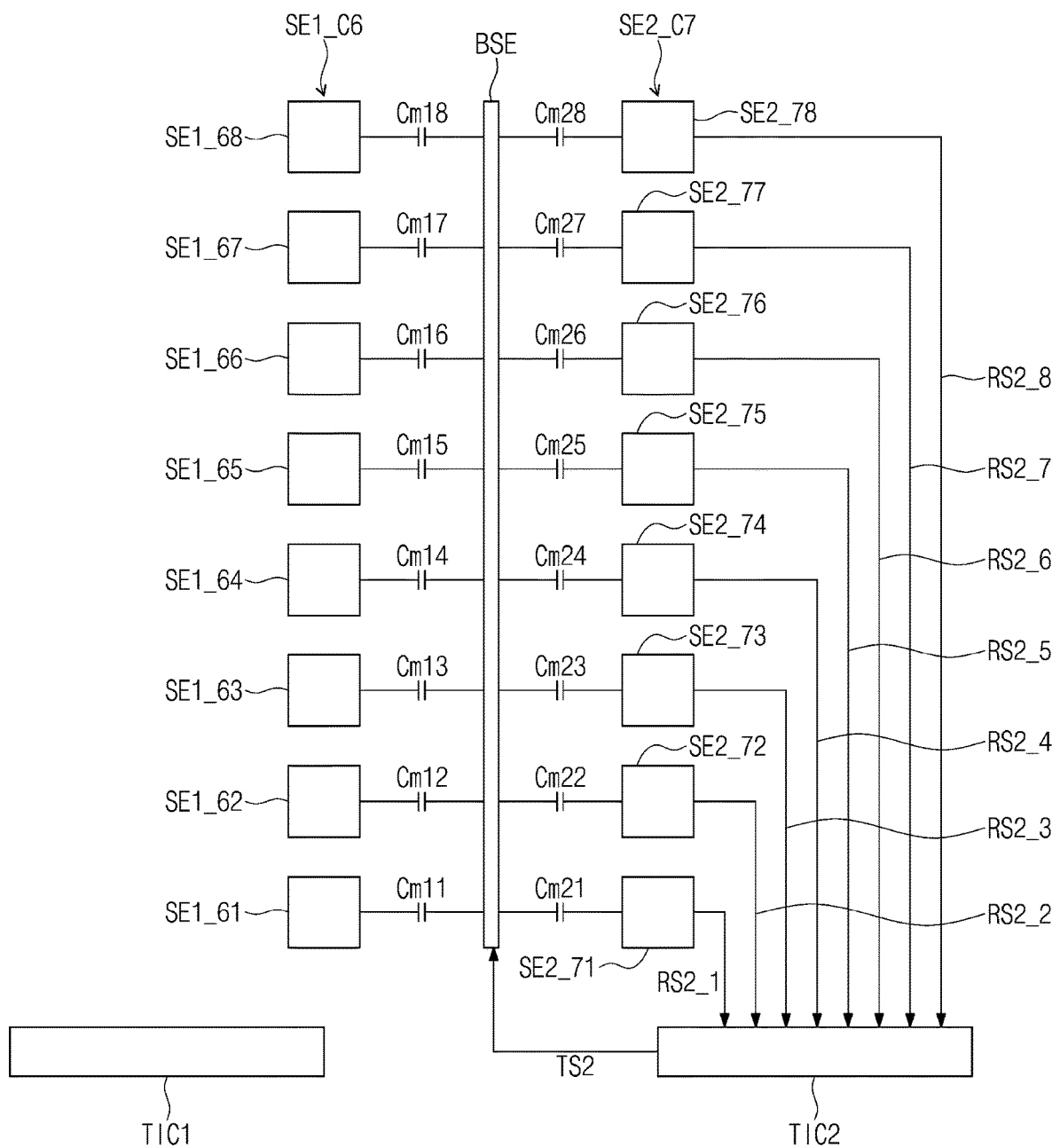

FIGS. 6A and 6B are views showing the operation of the input sensor ISP and the first and second sensor control circuits TIC1 and TIC2 in the second mode according to an embodiment of the present disclosure.

Referring to FIGS. 4 and 6A, during a first part of the second mode, the first sensor control circuit TIC1 may apply a first transmission signal TS1 to the boundary sensing electrode BSE and may receive first mutual sensing signals from some of the first sensing electrodes SE1, for example, the first sensing electrodes SE1_61 through SE1_68 of the sixth sensing electrode column SE1_C6, which are adjacent to the boundary sensing electrode BSE. In the second mode, the boundary sensing electrode BSE may form mutual capacitors Cm11 through Cm18 with the first sensing electrodes SE1_61 through SE1_68 of the sixth sensing electrode column SE1_C6. The first sensing electrodes SE1_61 through SE1_68 of the sixth sensing electrode column SE1_C6 may be referred to as first through eighth adjacent sensing electrodes. Signals from the first through eighth adjacent sensing electrodes SE1_61 through SE1_68 may be referred to as first through eighth adjacent sensing signals RS1_1 through RS1_8, respectively. For example, the first mutual sensing signals may include the first through eighth adjacent sensing signals RS1_1 through RS1_8. Accordingly, the first through eighth mutual capacitors Cm11 through Cm18 may be formed between the boundary sensing electrode BSE and the first through eighth adjacent sensing electrodes SE1_61 through SE1_68.

When the first transmission signal TS1 is applied to the boundary sensing electrode BSE, an electric potential of each of the first through eighth adjacent sensing electrodes SE1_61 through SE1_68 may be determined by the first through eighth mutual capacitors Cm11 through Cm18. Then, the first sensor control circuit TIC1 may sequentially receive the first through eighth adjacent sensing signals RS1_1 through RS1_8 from the first through eighth adjacent sensing electrodes SE1_61 through SE1_68. The adjacent sensing signal at a point where an input is provided may have a level different from that of the adjacent sensing signal at a point where an input is not provided. For example, a user input applied near the boundary sensing electrode BSE may be detected and the coordinates thereof determined through this process. The first sensor control circuit TIC1 may obtain a first mutual sensing result with respect to the input from the first through eighth adjacent sensing signals RS1_1 through RS1_8.

Referring to FIGS. 4 and 6B, during a second part of the second mode, the second sensor control circuit TIC2 may apply the second transmission signal TS2 to the boundary sensing electrode BSE and may receive second mutual sensing signals from some of the second sensing electrodes SE2, for example, the second sensing electrodes SE2_71 through SE2_78 of the seventh sensing electrode column SE2_C7, which are adjacent to the boundary sensing electrode BSE. In the second mode, the boundary sensing electrode BSE may form mutual capacitors Cm21 through Cm28 with the second sensing electrodes SE2_71 through SE2_78 of the seventh sensing electrode column SE2_C7. The second sensing electrodes SE2_71 through SE2_78 of the seventh sensing electrode column SE2_C7 may be referred to as ninth through sixteenth adjacent sensing electrodes. Signals from the ninth through sixteenth adjacent sensing electrodes SE2_71 through SE2_78 may be referred to as ninth through sixteenth adjacent sensing signals RS2_1 through RS2_8, respectively. For example, the second mutual sensing signals may include the ninth through sixteenth adjacent sensing signals RS2_1 through RS2_8. The ninth through sixteenth mutual capacitors Cm21 through Cm28 may be formed between the boundary sensing electrode BSE and the ninth through sixteenth adjacent sensing electrodes SE2_71 through SE2_78.

When the second transmission signal TS2 is applied to the boundary sensing electrode BSE, an electric potential of each of the ninth through sixteenth adjacent sensing electrodes SE2_71 through SE2_78 may be determined by the ninth through sixteenth mutual capacitors Cm21 through Cm28. Then, the second sensor control circuit TIC2 may sequentially receive the ninth through sixteenth adjacent sensing signals RS2_1 through RS2_8 from the ninth through sixteenth adjacent sensing electrodes SE2_71 through SE2_78. The adjacent sensing signal at the point where the input is provided may have a level different from that of the adjacent sensing signal at the point where the input is not provided. For example, a user input applied near the boundary sensing electrode BSE may be detected and the coordinates thereof determined through this process. The second sensor control circuit TIC2 may obtain a second mutual sensing result with respect to the input from the ninth through sixteenth adjacent sensing signals RS2_1 through RS2_8.

The first sensor control circuit TIC1 may combine the first self-sensing result obtained from the first sensing electrodes in the first mode and the first mutual sensing result obtained from the first through eighth adjacent sensing electrodes SE1_61 through SE1_68 in the second mode to generate a first final sensing result. In addition, the second sensor control circuit TIC2 may combine the second self-sensing result obtained from the second sensing electrodes in the first mode and the second mutual sensing result obtained from the ninth through sixteenth adjacent sensing electrodes SE2_71 through SE2_78 in the second mode to generate a second final sensing result.

As described above, the input sensor ISP according to the present disclosure may sense the input occurring in the boundary by two sensing methods, e.g., the self-capacitance method and the mutual capacitance method, using the boundary sensing electrode BSE disposed in the boundary between the first and second areas A1 and A2, and thus, the sensing characteristics in the boundary may be improved. Additionally, as the first sensing lines SL1_11 to SL1_68 of each of the line groups SL1_G1 to SL1_G6 are each disposed to overlap its corresponding sensing electrode column, distances between sensing electrode columns SE1_C1 to SE1_C6 may be reduced, and a non-effective sensing area may be minimized.

Figure 7A:
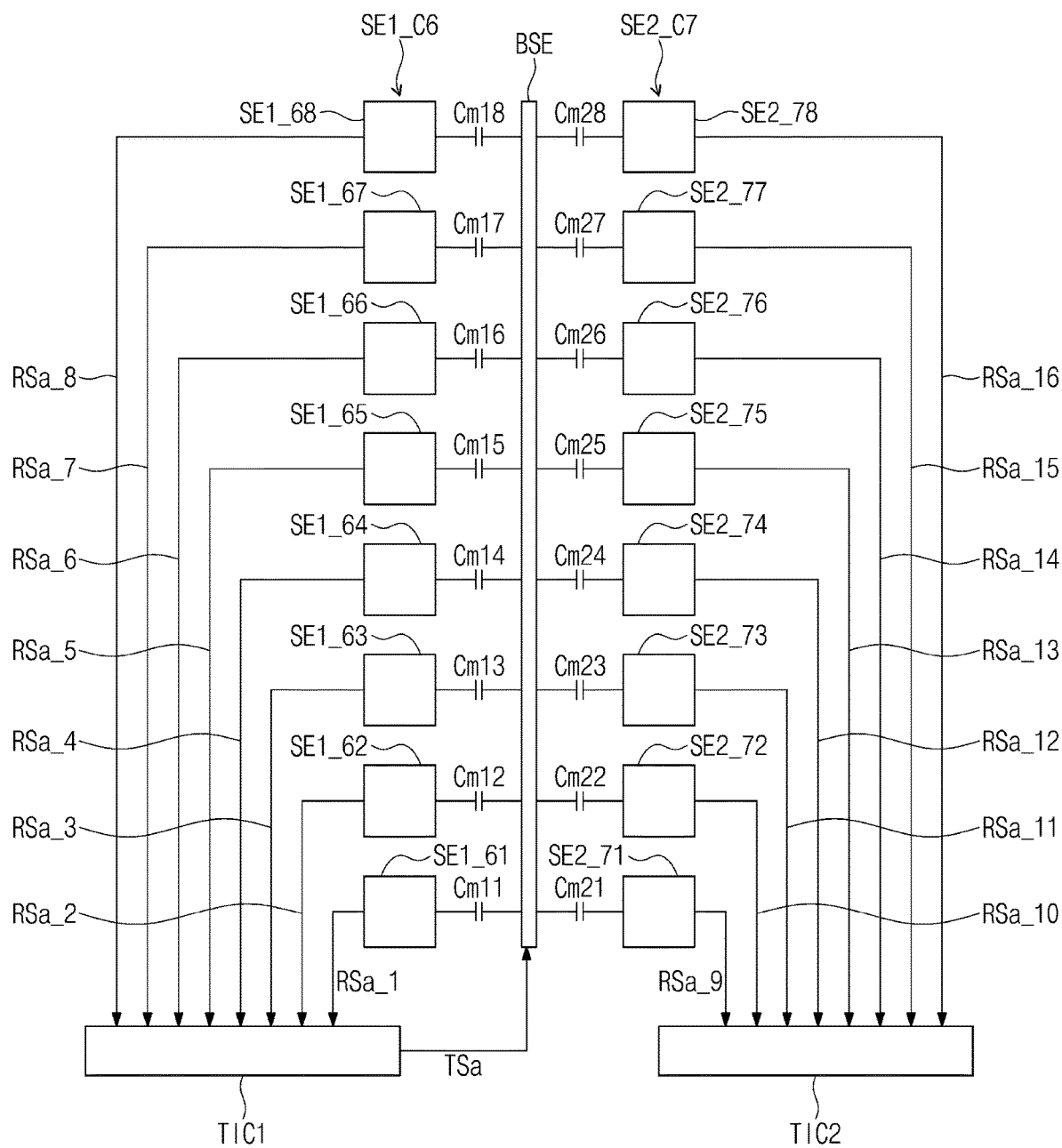
FIGS. 7A and 7B are views showing an operation of an input sensor and first and second sensor control circuits in a second mode according to an embodiment of the present disclosure.
Figure 7B:
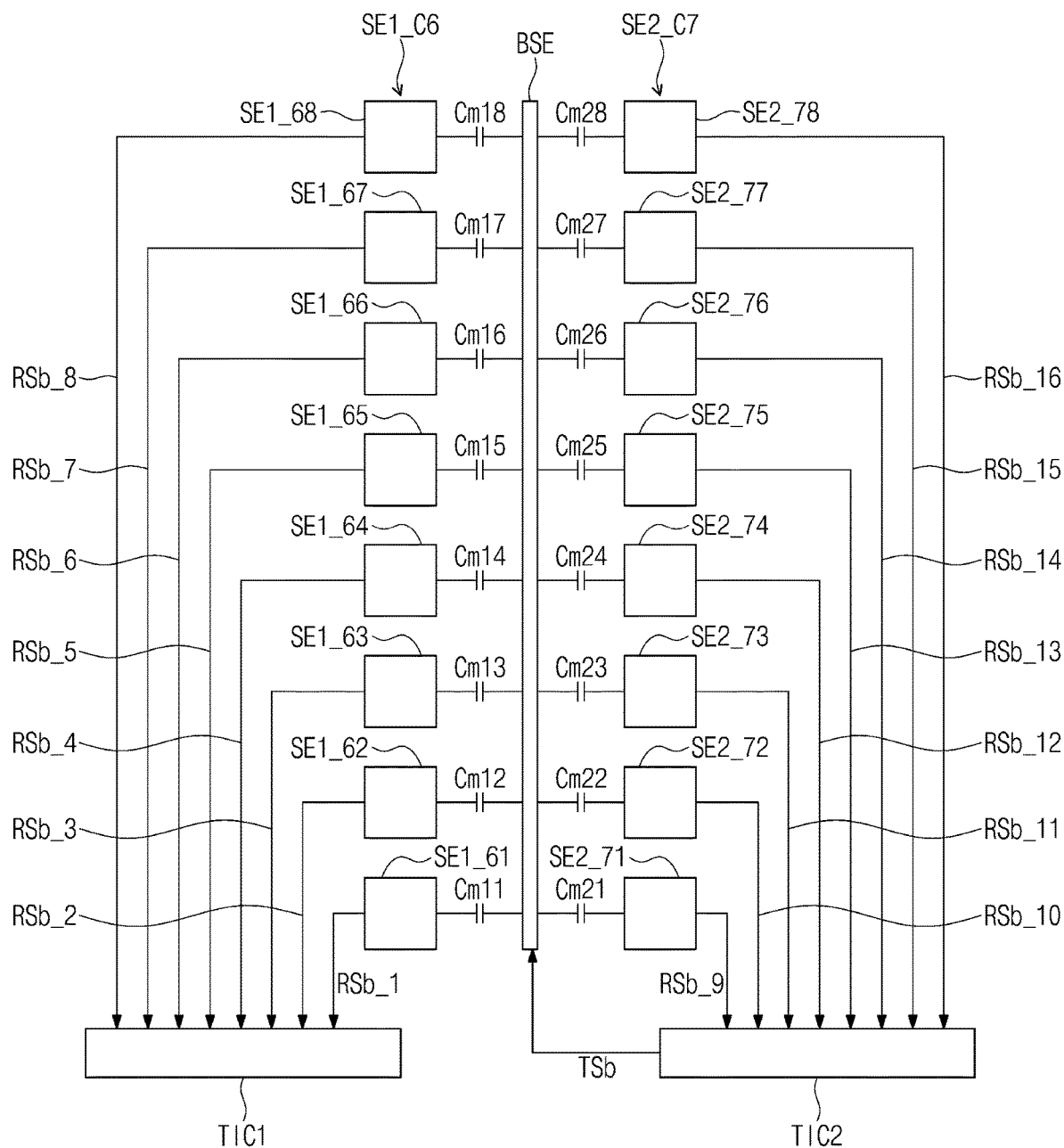

FIGS. 7A and 7B are views showing an operation of an input sensor and first and second sensor control circuits in a second mode according to an embodiment of the present disclosure.

Referring to FIGS. 4, 7A, and 7B, during a first part of the second mode, the first sensor control circuit TIC1 may apply a first transmission signal TSa to the boundary sensing electrode BSE, and the first sensor control circuit TIC1 may receive first mutual sensing signals from some of the first sensing electrodes SE1. During the first part, the second sensor control circuit TIC2 may receive second mutual sensing signals from some of the second sensing electrodes SE2. As contrasted with the operation shown in FIGS. 6A and 6B, the operation described with reference to FIGS. 7A and 7B may provide for second mutual sensing signals to enter the second sensor control circuit TIC2 concurrently with the first mutual sensing signals entering the first sensor control circuit TIC1 in this first part of the second mode.

For example, during the first part of the second mode, the boundary sensing electrode BSE may form first through eighth mutual capacitors Cm11 through Cm18 with first through eighth adjacent sensing electrodes SE1_61 through SE1_68, respectively. In addition, during the first part of the second mode, the boundary sensing electrode BSE may form ninth through sixteenth mutual capacitors Cm21 through Cm28 with ninth through sixteenth adjacent sensing electrodes SE2_71 through SE2_78.

When the first transmission signal TSa is applied to the boundary sensing electrode BSE, an electric potential of each of the first through eighth adjacent sensing electrodes SE1_61 through SE1_68 may be determined by the first through eighth mutual capacitors Cm11 through Cm18, and an electric potential of each of the ninth through sixteenth adjacent sensing electrodes SE2_71 through SE2_78 may be determined by the ninth through sixteenth mutual capacitors Cm21 through Cm28. Then, the first sensor control circuit TIC1 may sequentially receive first through eighth adjacent sensing signals RSa_1 through RSa_8 from the first through eighth adjacent sensing electrodes SE1_61 through SE1_68, and the second sensor control circuit TIC2 may sequentially receive ninth through sixteenth adjacent sensing signals RSa_9 through RSa_16 from the ninth through sixteenth adjacent sensing electrodes SE2_71 through SE2_78. For example, the first mutual sensing signals may be the first through eighth adjacent sensing signals RSa_1 through RSa_8, and the second mutual sensing signals may be the ninth through sixteenth adjacent sensing signals RSa_9 through RSa_16.

During a second part of the second mode, the second sensor control circuit TIC2 may apply a second transmission signal TSb to the boundary sensing electrode BSE, and the first sensor control circuit TIC1 may receive third mutual sensing signals from some of the first sensing electrodes SE1. Additionally or alternatively, during the second part, the second sensor control circuit TIC2 may receive fourth mutual sensing signals from some of the second sensing electrodes SE2.

During the second part of the second mode, the boundary sensing electrode BSE may form the first through eighth mutual capacitors Cm11 through Cm18 with the first through eighth adjacent sensing electrodes SE1_61 through SE1_68. In addition, during the second part of the second mode, the boundary sensing electrode BSE may form the ninth through sixteenth mutual capacitors Cm21 through Cm28 with the ninth through sixteenth adjacent sensing electrodes SE2_71 through SE2_78.

When the second transmission signal TSb is applied to the boundary sensing electrode BSE, an electric potential of each of the first through eighth adjacent sensing electrodes SE1_61 through SE1_68 may be determined by the first through eighth mutual capacitors Cm11 through Cm18, and an electric potential of each of the ninth through sixteenth adjacent sensing electrodes SE2_71 through SE2_78 may be determined by the ninth through sixteenth mutual capacitors Cm21 through Cm28. Then, the first sensor control circuit TIC1 may sequentially receive seventeenth through twenty-fourth adjacent sensing signals RSb_1 through RSb_8 from the first through eighth adjacent sensing electrodes SE1_61 through SE1_68, and the second sensor control circuit TIC2 may sequentially receive twenty-fifth through thirty-second adjacent sensing signals RSb_9 through RSb_16 from the ninth through sixteenth adjacent sensing electrodes SE2_71 through SE2_78. For example, the third mutual sensing signals may be the seventeenth through twenty-fourth adjacent sensing signals RSb_1 through RSb_8, and the fourth mutual sensing signals may be the twenty-fifth through thirty-second adjacent sensing signals RSb_9 through RSb_16.

The first sensor control circuit TIC1 may obtain the first mutual sensing result with respect to the input from the first through eighth adjacent sensing signals RSa_1 through RSa_8 and the seventeenth through twenty-fourth adjacent sensing signals RSb_1 through RSb_8. The second sensor control circuit TIC2 may obtain the second mutual sensing result with respect to the input from the ninth through sixteenth adjacent sensing signals RSa_9 through RSa_16 and the twenty-fifth through thirty-second adjacent sensing signals RSb_9 through RSb_16.

The first sensor control circuit TIC1 may combine the first self-sensing result obtained from the first sensing electrodes SE1 in the first mode and the first mutual sensing result obtained from the first through eighth adjacent sensing electrodes SE1_61 through SE1_68 in the second mode to generate the first final sensing result. Additionally or alternatively, the second sensor control circuit TIC2 may combine the second self-sensing result obtained from the second sensing electrodes SE2 in the first mode and the second mutual sensing result obtained from the ninth through sixteenth adjacent sensing electrodes SE2_71 through SE2_78 in the second mode to generate the second final sensing result.

When the first and second sensor control circuits TIC1 and TIC2 obtain the sensing result from an input applied to the boundary of the first and second areas A1 and A2, different sensing results from each other may be obtained. The difference in sensing results for each sensor control circuit may cause a deterioration in the sensing characteristics in the boundary of the first and second areas A1 and A2. However, as the input sensor ISP according to the present disclosure includes the boundary sensing electrode BSE disposed in the boundary of the first and second areas A1 and A2 and commonly connected to the first and second sensor control circuits TIC1 and TIC2, the difference in the sensing results for each sensor control circuit may be compensated. For example, when the first sensor control circuit TIC1 obtains the first final sensing result, the result with respect to the second transmission signal TSb transmitted from the second sensor control circuit TIC2 may be reflected to and/or combined with the first final sensing result. In addition, when the second sensor control circuit TIC2 obtains the second final sensing result, the result with respect to the first transmission signal TSa transmitted from the first sensor control circuit TIC1 may be reflected to and/or combined with the second final sensing result. Accordingly, the sensing characteristics in the boundary of the first and second areas A1 and A2 may be improved, and the difference in the sensing results for the sensor control circuits may be effectively compensated.

Figure 8A:
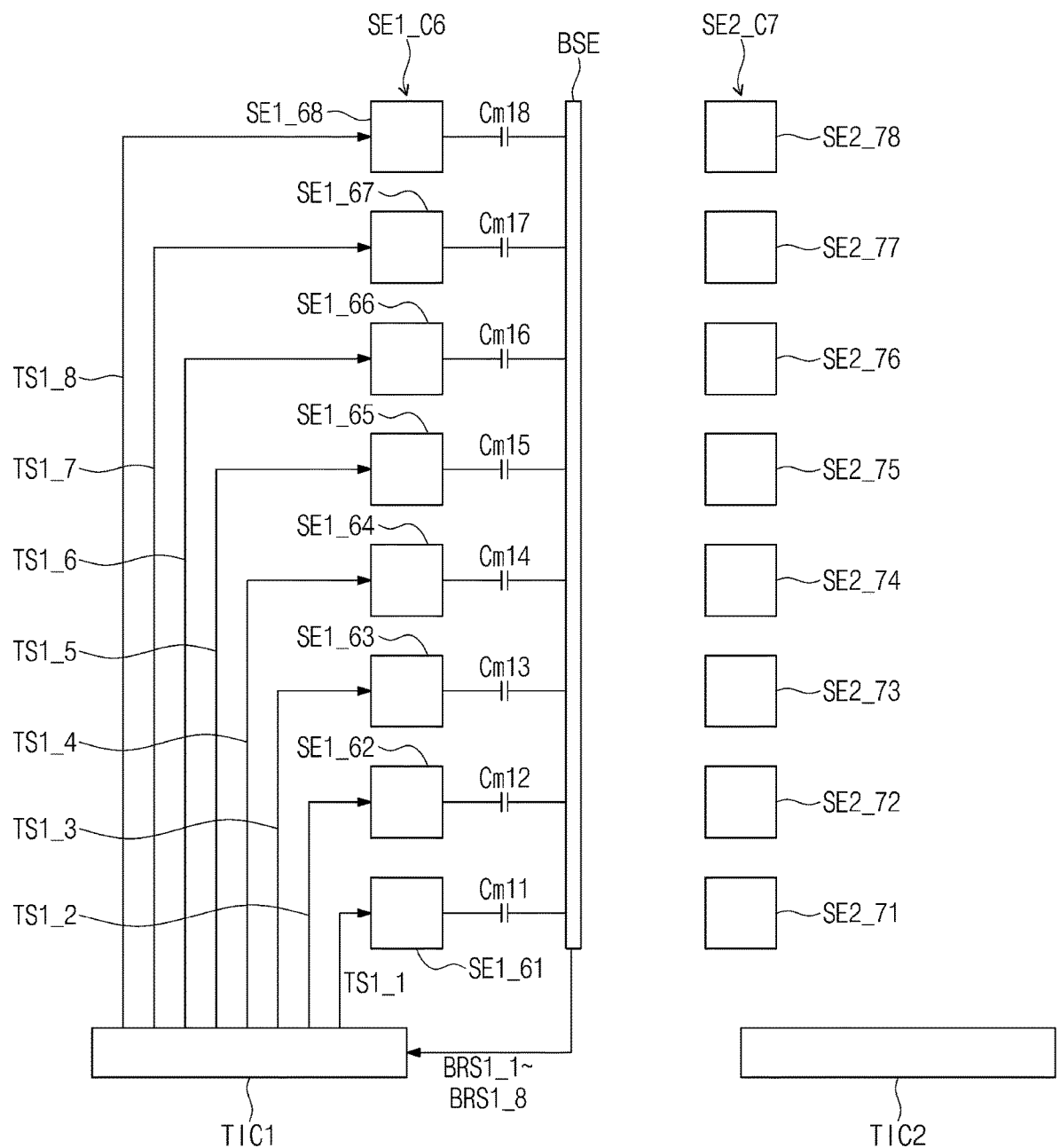
FIGS. 8A and 8B are views showing an operation of an input sensor and first and second sensor control circuits in a second mode according to an embodiment of the present disclosure.
Figure 8B:
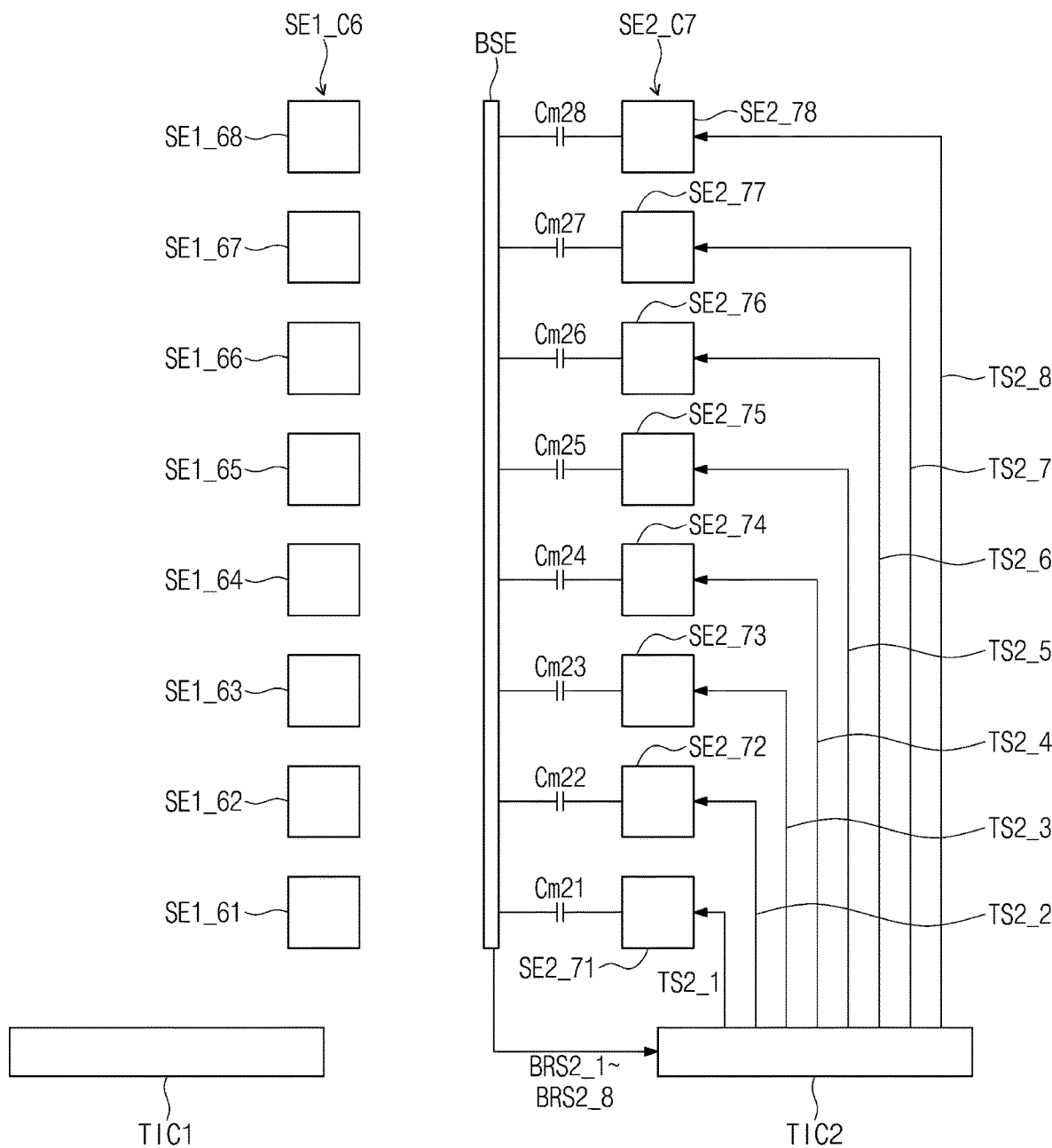

FIGS. 8A and 8B are views showing an operation of an input sensor and first and second sensor control circuits in a second mode according to an embodiment of the present disclosure.

Referring to FIGS. 4, 8A, and 8B, during a first part of the second mode, the first sensor control circuit TIC1 may sequentially transmit first transmission signals TS1_1 through TS1_8 to some of the first sensing electrodes SE1 e.g., the first sensing electrodes SE1_61 through SE1_68 of the sixth sensing electrode column SE1_C6. The first sensor control circuit TIC1 may, in response, sequentially receive first boundary sensing signals BRS1_1 through BRS1_8 from the boundary sensing electrode BSE, which may respectively correspond to the first transmission signals TS1_1 through TS1_8. Then, during a second part of the second mode, the second sensor control circuit TIC2 may sequentially transmit second transmission signals through TS2_8 to some of the second sensing electrodes SE2, e.g., the second sensing electrodes SE2_71 through SE2_78 of the seventh sensing electrode column SE2_C7. The second sensor control circuit TIC2 may, in response, sequentially receive second boundary sensing signals BRS2_1 through BRS2_8 from the boundary sensing electrode BSE, which may respectively correspond to the second transmission signals TS2_1 through TS2_8.

The first sensor control circuit TIC1 may obtain a first mutual sensing result with respect to the input from the first boundary sensing signals BRS1_1 through BRS1_8. The second sensor control circuit TIC2 may obtain a second mutual sensing result with respect to the input from the second boundary sensing signals BRS2_1 through BRS2_8.

The first sensor control circuit TIC1 may combine the first self-sensing result obtained from the first sensing electrodes SE1 in the first mode and the first mutual sensing result obtained from the boundary sensing electrode BSE in the second mode to generate a first final sensing result. In addition, the second sensor control circuit TIC2 may combine the second self-sensing result obtained from the second sensing electrodes SE2 in the first mode and the second mutual sensing result from the boundary sensing electrode BSE in the second mode to generate a second final sensing result.

As described above, the input sensor ISP according to the present disclosure may sense the input occurring in the boundary by two sensing methods, e.g., the self-capacitance method and the mutual capacitance method, using the boundary sensing electrode BSE disposed in the boundary between the first and second areas A1 and A2, and thus, the sensing characteristics in the boundary may be improved. Further, it will be understood from the description of example second mode operations of embodiments of the present disclosure with reference to FIGS. 6A-6B, 7A-7B, and 8A-8B, that the self-capacitance method and mutual capacitance methods may be achieved through many different implementations, and are not necessarily limited to those disclosed herein. For example, an input sensor according to the present disclosure may be configured to do one or more of the second mode operations described herein to achieve a mutual capacitance result.

Figure 9:
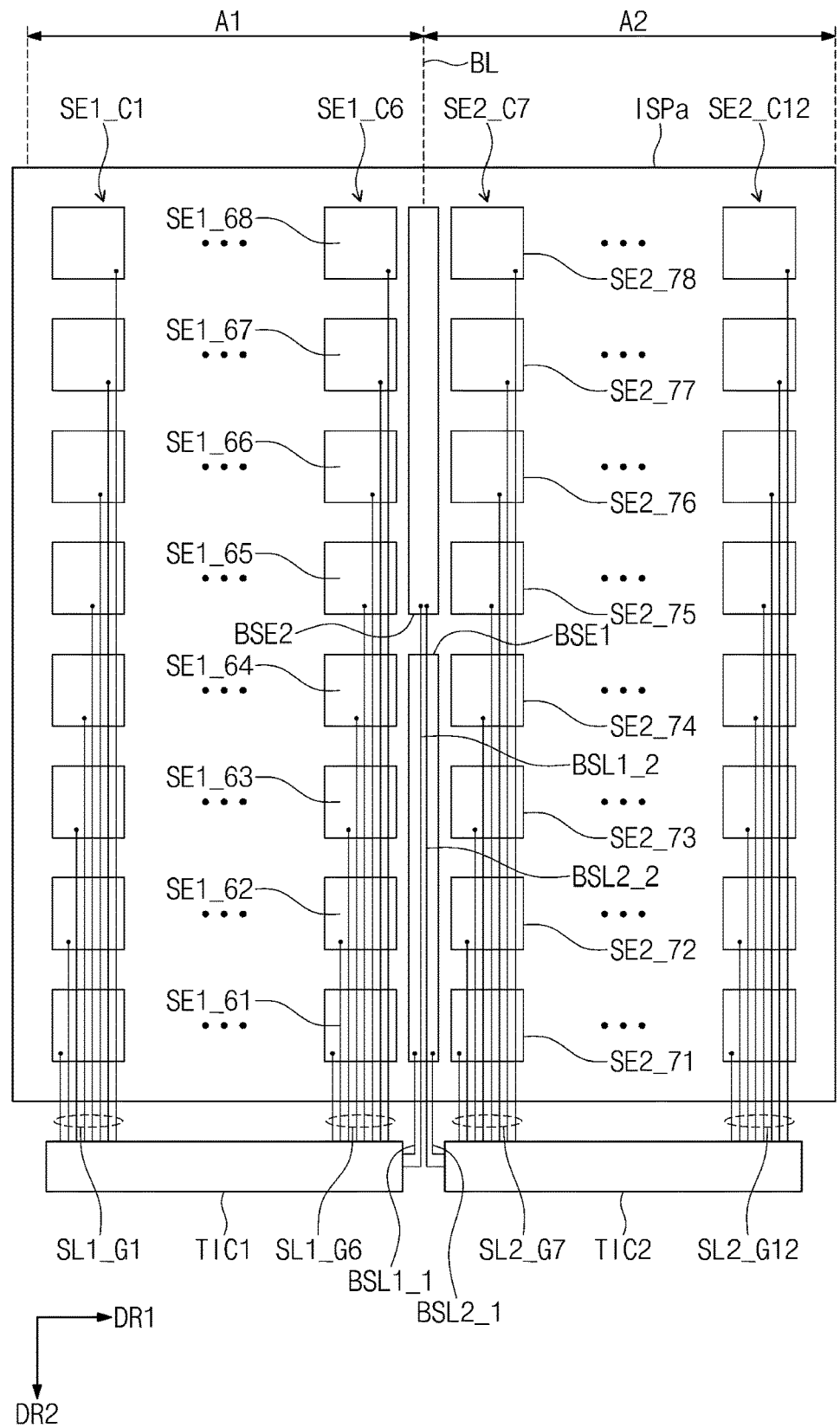
FIG. 9 is a view showing a connection between an input sensor and first and second sensor control circuits according to an embodiment of the present disclosure.

FIG. 9 is a view showing a connection relation between an input sensor ISPa and first and second sensor control circuits TIC1 and TIC2 according to an embodiment of the present disclosure.

Referring to FIG. 9, the input sensor ISPa according to the embodiment of the present disclosure may include a first boundary sensing electrode BSE1 and a second boundary sensing electrode BSE2. The first and second boundary sensing electrodes BSE1 and BSE2 may overlap an imaginary boundary line BL disposed in a boundary between first and second areas A1 and A2. When the first and second areas A1 and A2 are disposed adjacent to each other in the first direction DR1, the first and second boundary sensing electrodes BSE1 and BSE2 may be disposed adjacent to each other in the second direction DR2 substantially parallel to the boundary line BL.

The input sensor ISPa, may include first and second boundary sensing lines BSL1_1 and BSL1_2 electrically connected to the first boundary sensing electrode BSE1 and third and fourth boundary sensing lines BSL2_1 and BSL2_2 electrically connected to the second boundary sensing electrode BSE2.

The first boundary sensing line BSL1_1 may electrically connect the first boundary sensing electrode BSE1 to the first sensor control circuit TIC1, and the second boundary sensing line BSL2_1 may electrically connect the first boundary sensing electrode BSE1 to the second sensor control circuit TIC2. For example, the first boundary sensing electrode BSE1 may be commonly connected to the first and second sensor control circuits TIC1 and TIC2. The third boundary sensing line BSL1_2 may electrically connect the second boundary sensing electrode BSE2 to the first sensor control circuit TIC1, and the fourth boundary sensing line BSL2_2 may electrically connect the second boundary sensing electrode BSE2 to the second sensor control circuit TIC2. For example, the second boundary sensing electrode BSE2 may be commonly connected to the first and second sensor control circuits TIC1 and TIC2.

The first boundary sensing electrode BSE1 may form a mutual capacitor with some of first to eighth adjacent sensing electrodes SE1_61 to SE1_68 disposed in the first area A1 adjacent to the boundary line BL, e.g., first to fourth adjacent sensing electrodes SE1_61 to SE1_64. The second boundary sensing electrode BSE2 may form a mutual capacitor with some of the first to eighth adjacent sensing electrodes SE1_61 to SE1_68 disposed in the first area A1 adjacent to the boundary line BL, e.g., fifth to eighth adjacent sensing electrodes SE1_65 to SE1_68. The first boundary sensing electrode BSE1 may also form a mutual capacitor with some of ninth to sixteenth adjacent sensing electrodes SE2_71 to SE2_78 disposed in the second area A2 adjacent to the boundary line BL, e.g., ninth to twelfth adjacent sensing electrodes SE2_71 to SE2_74. The second boundary sensing electrode BSE2 may also form a mutual capacitor with some of the ninth to sixteenth adjacent sensing electrodes SE2_71 to SE2_78 disposed in the second area A2 adjacent to the boundary line BL, e.g., thirteenth to sixteenth adjacent sensing electrodes SE2_75 to SE2_78.

The method of driving the input sensor in the second mode from the first and second boundary sensing electrodes BSE1 and BSE2 is similar to that described with reference to FIGS. 6A to 8B, and thus, details thereof will be omitted.

In addition, FIG. 9 shows the structure in which two boundary sensing electrodes BSE1 and BSE2 are disposed in the input sensor ISPa as a representative example, however, the number of the boundary sensing electrodes is not necessarily limited thereto. The number of the boundary sensing electrodes may be changed depending on the size and shape of the input sensors ISP and ISPa.

Figure 10:
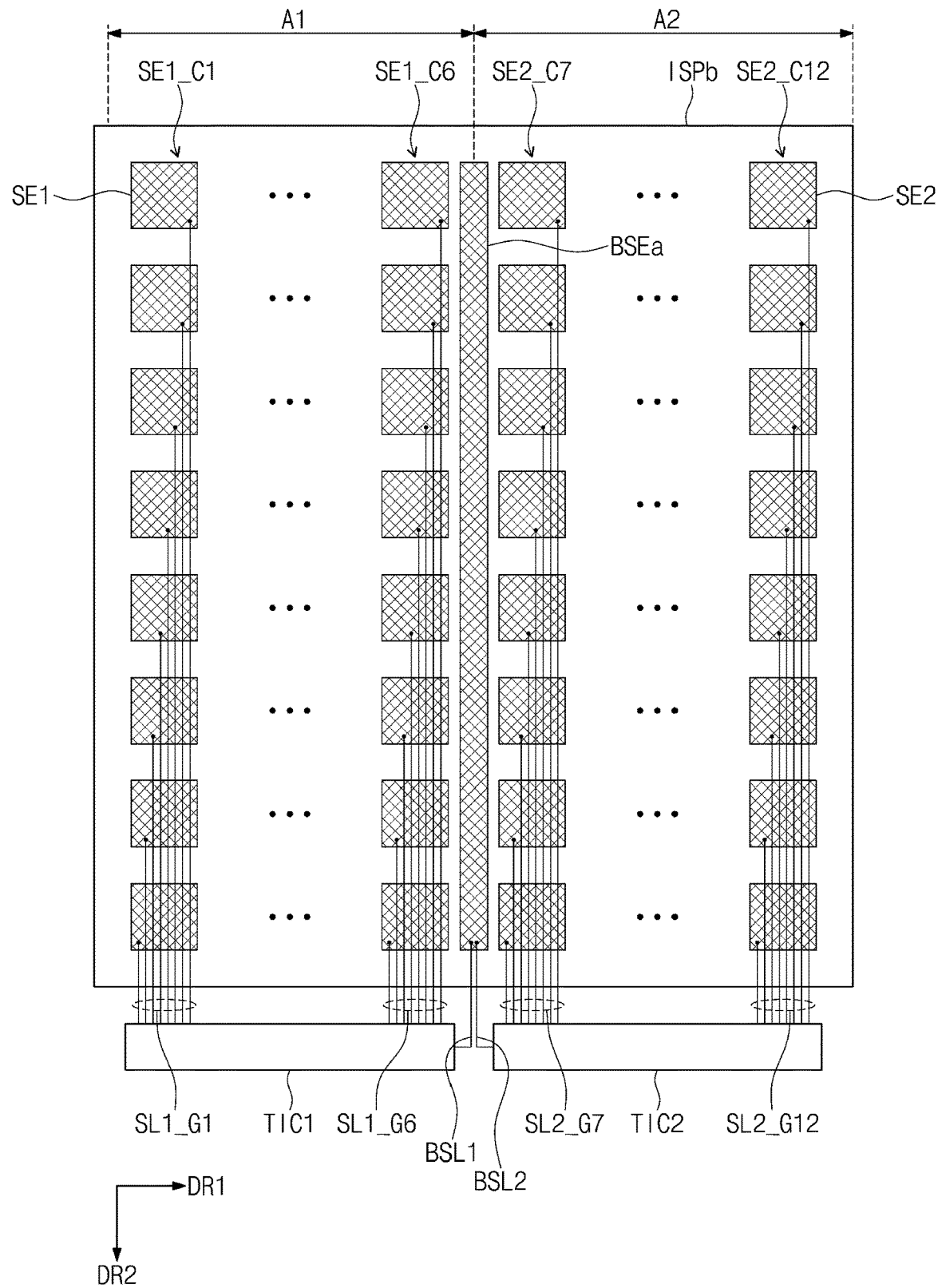
FIG. 10 is a plan view showing an input sensor according to an embodiment of the present disclosure.

FIG. 10 is a plan view of an input sensor ISPb according to an embodiment of the present disclosure.

Referring to FIG. 10, the input sensor ISPb may include first sensing electrodes SE1 disposed in the first area A1, second sensing electrodes SE2 disposed in the second area A2, and a boundary sensing electrode BSE disposed to overlap a boundary between the first area A1 and the second area A2.

Each of the first sensing electrodes SE1 may have its own coordinate information. The first sensing electrodes SE1 may be arranged in the first area A1 in a matrix pattern. Each of the first sensing electrodes SE1 may have a polygonal shape. Each of the first sensing electrodes SE1 may have a mesh pattern within. Each of the first sensing electrodes SE1 may include a plurality of first mesh lines, and each of the first mesh lines may extend in a direction inclined with respect to the first direction DR1 or the second direction DR2. The direction in which each of the first mesh lines extends is not necessarily limited. For example, each of the first mesh lines may extend substantially parallel to the first direction DR1 or the second direction DR2.

Each of the second sensing electrodes SE2 may have its own coordinate information. The second sensing electrodes SE2 may be arranged in the second area A2 in a matrix pattern. Each of the second sensing electrodes SE2 may have a polygonal shape. Each of the second sensing electrodes SE2 may have a mesh pattern within. Each of the second sensing electrodes SE2 may include a plurality of second mesh lines, and each of the second mesh lines may extend in a direction inclined with respect to the first direction DR1 or the second direction DR2. The direction in which each of the second mesh lines extends is not necessarily limited. For example, each of the second mesh lines may extend substantially parallel to the first direction DR1 or the second direction DR2.

The boundary sensing electrode BSE may be disposed at a position overlapping an imaginary boundary line BL disposed in a boundary between the first area A1 and the second area A2. In particular, the boundary sensing electrode BSE may be disposed adjacent to some of the first sensing electrodes SE1 that are adjacent to the boundary line BL among the first sensing electrodes SE1 and some of the second sensing electrodes SE2 that are adjacent to the boundary line BL among the second sensing electrodes SE2. The boundary sensing electrode BSE may extend in a direction substantially parallel to the boundary line BL, e.g., the second direction DR2. The boundary sensing electrode BSE may have a mesh pattern within. The boundary sensing electrode BSE may include a plurality of third mesh lines, and each of the third mesh lines may extend in a direction inclined with respect to the first direction DR1 or the second direction DR2. The direction in which each of the third mesh lines extends is not necessarily limited. For example, each of the third mesh lines may extend substantially parallel to the first direction DR1 or the second direction DR2.

Figure 11:
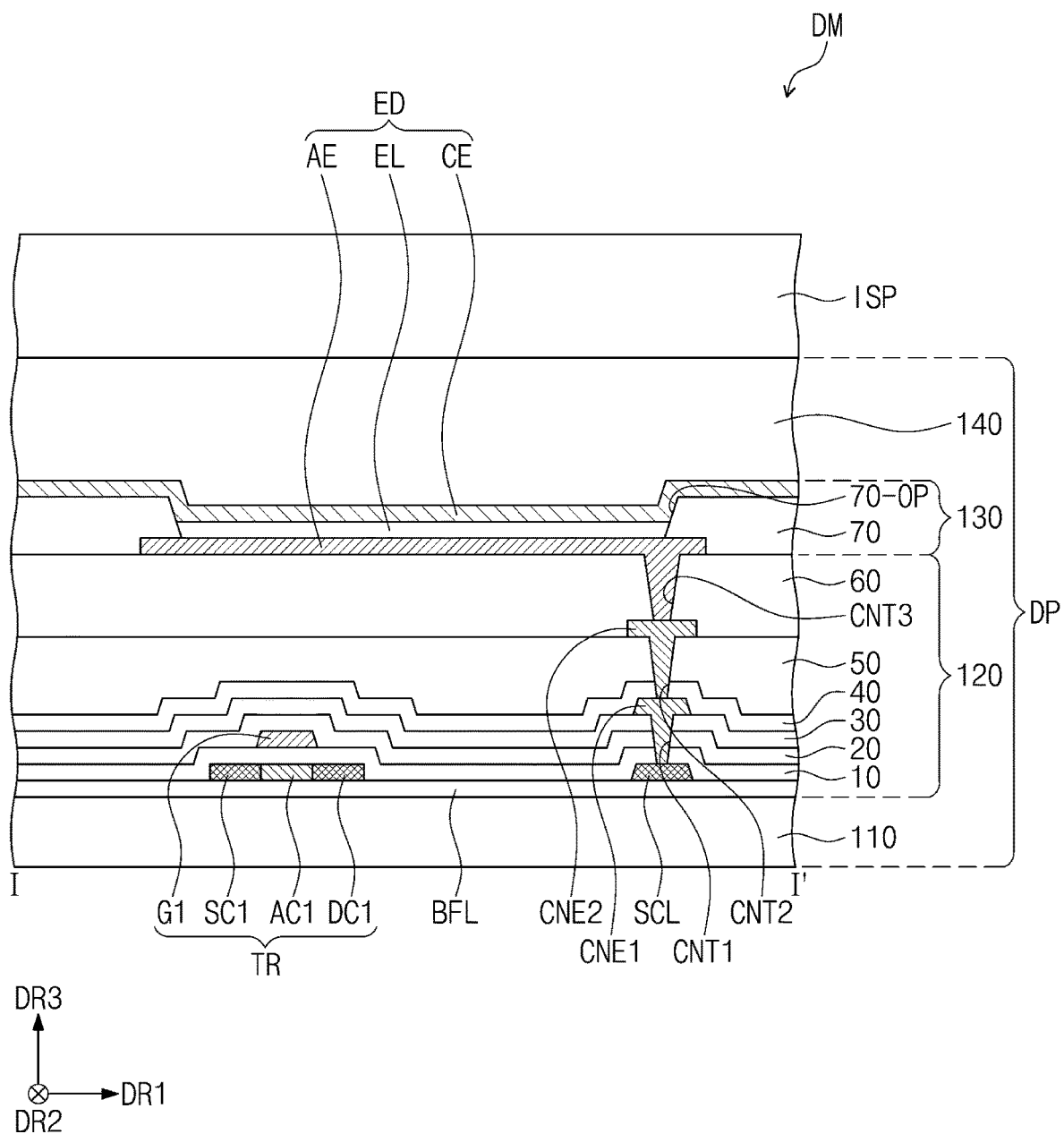
FIG. 11 is a cross-sectional view of a display module taken along a line I-I' shown in FIG. 3.
Figure 12A:
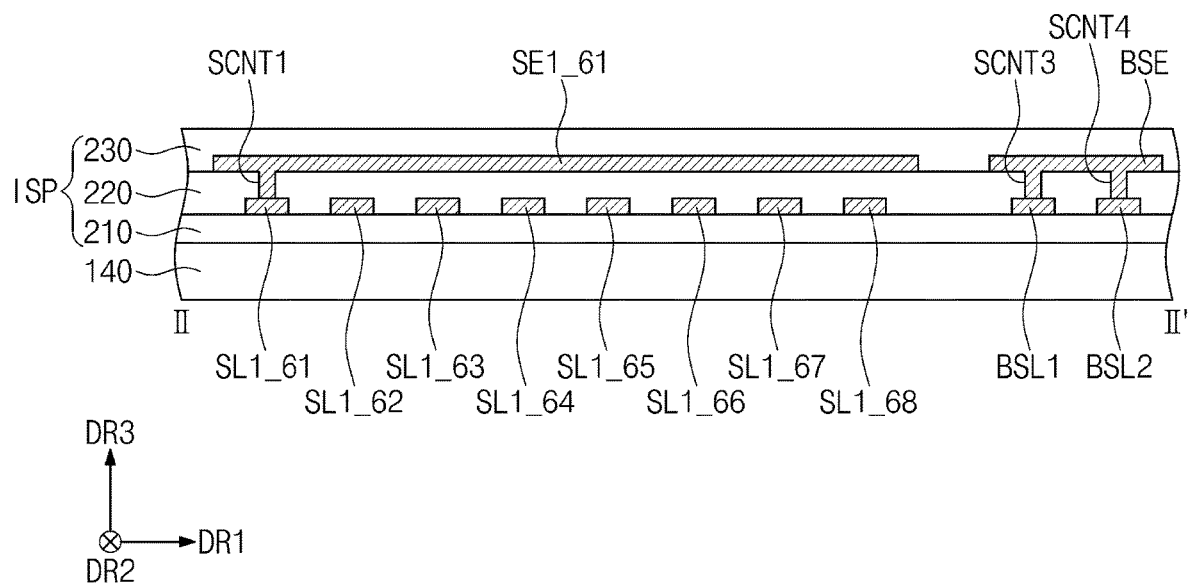
FIG. 12A is a cross-sectional view of an input sensor taken along a line II-II' shown in FIG. 5.
Figure 12B:
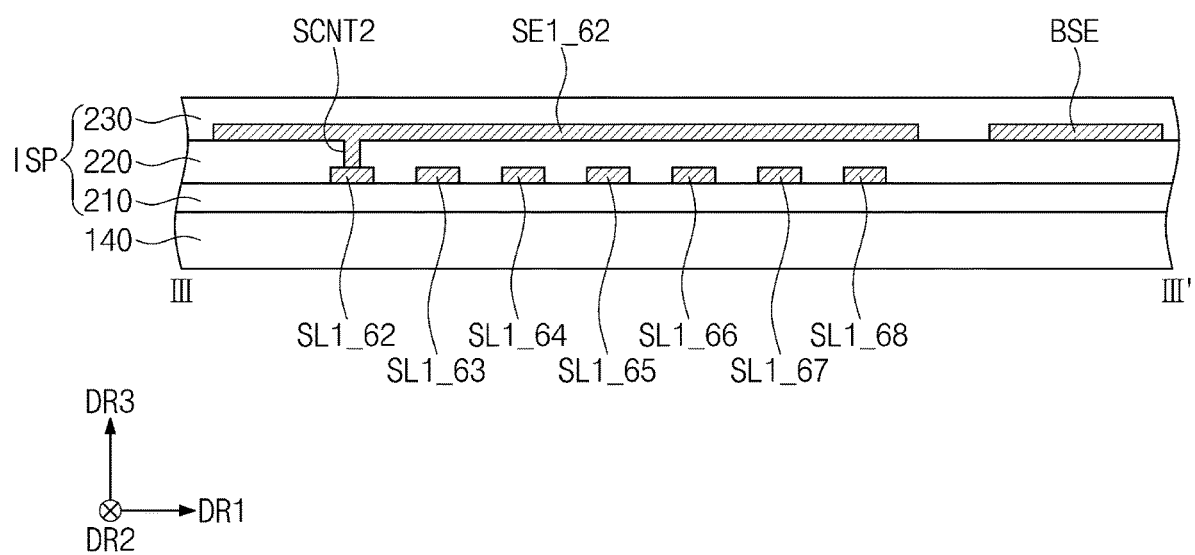
FIG. 12B is a cross-sectional view of an input sensor taken along a line III-III' shown in FIG. 5.

FIG. 11 is a cross-sectional view of a display module DM taken along a line I-I' shown in FIG. 3. FIG. 12A is a cross-sectional view of an input sensor taken along a line II-II' shown in FIG. 5, and FIG. 12B is a cross-sectional view of an input sensor taken along a line shown in FIG. 5.

Referring to FIG. 11, the display module DM may include the display panel DP and the input sensor ISP. The display panel DP may include a base layer 110, a circuit layer 120, a light emitting element layer 130, and an encapsulation layer 140.

The base layer 110 may provide a base surface on which the circuit layer 120 is disposed. The base layer 110 may be a glass substrate, a metal substrate, or a polymer substrate. However, the embodiment is not necessarily limited thereto, and the base layer 110 may be an inorganic layer, an organic layer, or a composite material layer, or a combination thereof.

The base layer 110 may have a multi-layer structure. For instance, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may constitute a base barrier layer.

Each of the first and second synthetic resin layers may include a polyimide-based resin. In addition, each of the first and second synthetic resin layers may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a coating or depositing process. The insulating layer, the semiconductor layer, and the conductive layer may be selectively patterned through several photolithography processes. The semiconductor pattern, the conductive pattern, and the signal line included in the circuit layer 120 may be formed from these processes.

The light emitting element layer 130 may be disposed on the circuit layer 120. The light emitting element layer 130 may include the light emitting element. For example, the light emitting element layer 130 may include an organic light emitting material, a quantum dot, a quantum rod, a micro-LED, or a nano-LED.

The encapsulation layer 140 may be disposed on the light emitting element layer 130 in a thickness direction (e.g. the third direction DR3). The encapsulation layer 140 may protect the light emitting element layer 130 from moisture, oxygen, and foreign substances such as dust particles.

The input sensor ISP may be formed on the display panel DP through multiple processes. The input sensor ISP may be disposed directly on the display panel DP. In the following descriptions, the expression that component "B" is "directly disposed" on component "A" means that no intervening elements are present between the component "B" and the component "A". For example, a separate adhesive member may not be disposed between the input sensor ISP and the display panel DP. The input sensor ISP may be coupled with the display panel DP by an adhesive layer. The adhesive layer may include a conventional adhesive.

At least one inorganic layer may be formed on an upper surface of the base layer 110. The inorganic layer may include at least one of aluminum oxide, titanium oxide, silicon oxide, silicon oxynitride, zirconium oxide, and hafnium oxide. The inorganic layer may be formed in multiple layers. The inorganic layers may form a barrier layer and/or a buffer layer. In the present embodiment, the display layer DP may further include a buffer layer BFL.

The buffer layer BFL may increase a coupling force between the base layer 110 and the semiconductor pattern. The buffer layer BFL may include a silicon oxide layer and a silicon nitride layer, and the silicon oxide layer and the silicon nitride layer may be alternately stacked with each other.

The semiconductor pattern may be disposed on the buffer layer BFL. The semiconductor pattern may include poly-silicon, however, it is not necessarily limited thereto. The semiconductor pattern may include amorphous silicon, low-temperature polycrystalline silicon, or oxide semiconductor.

FIG. 11 shows a portion of the semiconductor pattern, and the semiconductor pattern may be further disposed in other areas. The semiconductor pattern may be arranged in a specific design overlapping the pixels in a thickness direction. The semiconductor pattern may have different electrical properties depending on whether or not it is doped, or, if it is doped, whether it is doped with an N-type dopant or a P-type dopant. The semiconductor pattern may include a high conductivity region with high conductivity and a low conductivity region with low conductivity. The high conductivity region may be doped with the N-type dopant or the P-type dopant. A P-type transistor may include a doped region doped with the P-type dopant, and an N-type transistor may include a doped region doped with the N-type dopant. The low conductivity region may be a non-doped region or may be doped at a concentration lower than the high conductivity region.

The high conductivity region may have a conductivity greater than that of the low conductivity region and may be configured as an electrode or signal line. The low conductivity region may substantially correspond to an active area (or a channel area) of the transistor. For example, a portion of the semiconductor pattern may be the active area of the transistor, another portion of the semiconductor pattern may be a source area or a drain area of the transistor, and the other portion of the semiconductor pattern may be a connection electrode or a connection signal line.

Each of the pixels may have an equivalent circuit that includes seven transistors, one capacitor, and the light emitting element. In some embodiments, the equivalent circuit of the pixels may be changed in various ways. FIG. 11 shows one transistor TR and the light emitting element ED included in the pixel.

The transistor TR may include a source region SC1, a channel region AC1, a drain region DC1, and a gate C1. The source region SC1, the channel region AC1, and the drain region DC1 may be formed in the semiconductor pattern. The source region SC1 and the drain region DC1 may be disposed on opposite sides of the channel region AC1 in a cross-section. FIG. 11 shows a portion of a connection signal line SCL formed from the semiconductor pattern. The connection signal line SCL may be electrically connected to the drain region DC1 of the transistor TR in a plane.

A first insulating layer 10 may be disposed on the buffer layer BFL. The first insulating layer 10 may substantially overlap the plurality of pixels and may cover the semiconductor pattern. The first insulating layer 10 may include an inorganic layer and/or an organic layer and may have a single-layer or multi-layer structure. The first insulating layer 10 may include at least one of aluminum oxide, titanium oxide, silicon oxide, silicon nitride, silicon oxynitride, zirconium oxide, and hafnium oxide. In the present embodiment, the first insulating layer 10 may have a single-layer structure of a silicon oxide layer. An insulating layer of the circuit layer 120 described later may also include an inorganic layer and/or an organic layer and may have a single-layer or multi-layer structure. The inorganic layer may include at least one of the above-mentioned materials, however, it is not necessarily limited thereto.

The gate G1 of the transistor TR may be disposed on the first insulating layer 10. The gate G1 may be a portion of a metal pattern. The gate G1 may overlap the channel region AC1 in the thickness direction (e.g., the third direction DR3). The gate G1 may be used as a mask in a process of doping the semiconductor pattern.

A second insulating layer 20 may be disposed on the first insulating layer 10 and may cover the gate G1. The second insulating layer 20 may substantially overlap the plurality of pixels. The second insulating layer 20 may include an inorganic layer and/or an organic layer and may have a single-layer or multi-layer structure. The second insulating layer 20 may include at least one of silicon oxide, silicon nitride, and silicon oxynitride. In the present embodiment, the second insulating layer 20 may have a single-layer structure of a silicon oxide layer.

A third insulating layer 30 may be disposed on the second insulating layer 20. The third insulating layer 30 may have a single-layer structure or a multi-layer structure. As an example, the third insulating layer 30 may have the multi-layer structure of a silicon oxide layer and a silicon nitride layer.

A first connection electrode CNE1 may be disposed on the third insulating layer 30. The first connection electrode CNE1 may be connected to the connection signal line SCL through a contact hole CNT1 which penetrates through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT2 which penetrates through the fourth insulating layer 40 and the fifth insulating layer 50.

A sixth insulating layer 60 may be disposed on the fifth insulating layer 50 and may at least partially cover the second connection electrode CNE2. The sixth insulating layer 60 may be an organic layer.

The light emitting element layer 130 may be disposed on the circuit layer 120. The light emitting element layer 130 may include the light emitting element ED and a pixel definition layer 70. For example, the light emitting element layer 130 may include an organic light emitting material, a quantum dot, a quantum rod, a micro-LED, or a nano-LED. Hereinafter, the organic light emitting element will be described as the light emitting element, however, the light emitting element is not necessarily limited thereto.

The light emitting element ED may include a first electrode AE, a light emitting layer EL, and a second electrode CE. The first electrode AE may be disposed on the sixth insulating layer 60. The first electrode AE may be connected to the second connection electrode CNE2 through a contact hole CNT3 which penetrates through the sixth insulating layer 60.

The pixel definition layer 70 may be disposed on the sixth insulating layer 60 and may cover a portion of the first electrode AR. An opening 70-OP may be defined through the pixel definition layer 70. A portion of the first electrode AE may be exposed through the opening 70-OP of the pixel definition layer 70.

The light emitting layer EL may be disposed on the first electrode AE. The light emitting layer EL may be disposed in an area corresponding to the opening 70-OP. For example, the light emitting layer EL may be divided into multiple portions, and may be formed in each of the pixels. In this case, each of the light emitting layers EL may emit a light having at least one of blue, red, and green colors, however, it is not necessarily limited thereto. The light emitting layer EL may be connected to the pixels and may commonly provide light to each pixel. In this case, the light emitting layer EL may provide a blue light or a white light.

The second electrode CE may be disposed on the light emitting layer EL. The second electrode CE may be formed integrally (for example, in a continuous shape) and may be commonly disposed over the pixels.

The encapsulation layer 140 may be disposed on the light emitting element layer 130. The encapsulation layer 140 may include an inorganic layer, an organic layer, and an inorganic layer, which are sequentially stacked, however, the types and number of layers of the encapsulation layer 140 are not necessarily limited thereto.

The inorganic layers may protect the light emitting element layer 130 from moisture and oxygen, and the organic layer may protect the light emitting element layer 130 from foreign substances such as dust particles. Each of the inorganic layers may include a silicon nitride layer, a silicon oxynitride layer, a silicon oxide layer, a titanium oxide layer, or an aluminum oxide layer. The organic; layer may include an acrylic-based organic layer, however, it is not necessarily limited thereto.

Referring to FIGS. 5, 12A and 12B, the input sensor ISP may include a base insulating layer 210, a first conductive layer, a sensing insulating layer 220, a second conductive layer, and a cover insulating layer 230.

The base insulating layer 210 may include an inorganic layer that includes at least one of silicon nitride, silicon oxynitride, and silicon oxide. Alternatively, the base insulating layer 210 may include an organic layer that includes an epoxy-based resin, an acrylic-based resin, or an imide-based resin. The base insulating layer 210 may have a single-layer structure or a multi-layer structure, where multiple layers are stacked one on another in the third direction DR3.

The first conductive layer may be disposed on the base insulating layer 210 and may include signal lines. Referring back to FIG. 5, the signal lines may include first signal lines SL1_G1 through SL1_G6, second signal lines SL2_G7 through SL2_G12, and first and second boundary signal lines BSL1 and BSL2. The signal lines may be spaced apart from each other at a predetermined distance in the first direction DR1.

The sensing insulating layer 220 may be disposed on the first conductive layer. The first conductive layer may be covered by the sensing insulating layer 220. The sensing insulating layer 220 may be provided with contact holes to expose the signal lines. In an example embodiment, FIG. 12A shows a first contact hole SCNT1 which exposes the signal line SL1_61 that is connected to the first adjacent sensing electrode SE1_61 among the first signal lines SL1_G1 through SL1_G6, and FIG. 12B shows a second contact hole SCNT2 which exposes the signal line SL1_62 that is connected to the second adjacent sensing electrode SE1_62 among the first signal lines SL1_G1 through SL1_G6.

The second conductive layer may be disposed on the sensing insulating layer 220. The second conductive layer may include the sensing electrodes. The sensing electrodes may include the first sensing electrodes SE1, the second sensing electrodes SE2, and the boundary sensing electrode BSE. Each of the sensing electrodes may be directly connected to a corresponding signal line through a contact hole. As illustrated in FIG. 12A, the first adjacent sensing electrode SE1_61 may be directly connected to the corresponding first signal line SL1_61 through the first contact hole SCNT1, and as illustrated in FIG. 12B, the second adjacent sensing electrode SE1_62 may be directly connected to the corresponding first signal line SL1_62 through the second contact hole SCNT2. As also illustrated in FIG. 12A, the boundary sensing electrode BSE may be directly connected to the first and second boundary signal lines BSL1 and BSL2 respectively through third and fourth contact holes SCNT3 and SCNT4.

The cover insulating layer 230 may be disposed on the second conductive layer. The second conductive layer may be covered by the cover insulating layer 230. The cover insulating layer 230 may protect the first and second conductive layers from moisture, oxygen, and foreign substances such as dust particles.

Each of the first conductive layer and the second conductive layer may have a single-layer structure or a multi-layer structure, where multiple layers are stacked in the third direction DR3. Each of the first conductive layer and the second conductive layer may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), indium zinc tin oxide (ITZO), or the like. In addition, the transparent conductive layer may include a conductive polymer such as PEDOT, a metal nanowire, a graphene, or the like.

Additionally or alternatively, each of the first conductive layer and the second conductive layer may include multiple metal layers. The metal layers may have, for example, a three-layer structure of titanium/aluminum/titanium. The conductive layer having the multi-layer structure may include at least one metal layer and at least one transparent conductive layer.

At least one of the sensing insulating layer 220 and the cover insulating layer 230 may include an inorganic layer. The inorganic layer may include at least one of aluminum oxide, titanium oxide, silicon oxide, silicon nitride, silicon oxynitride, zirconium oxide, and hafnium oxide.

At least one of the sensing insulating layer 220 and the cover insulating layer 230 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

Figure 13:
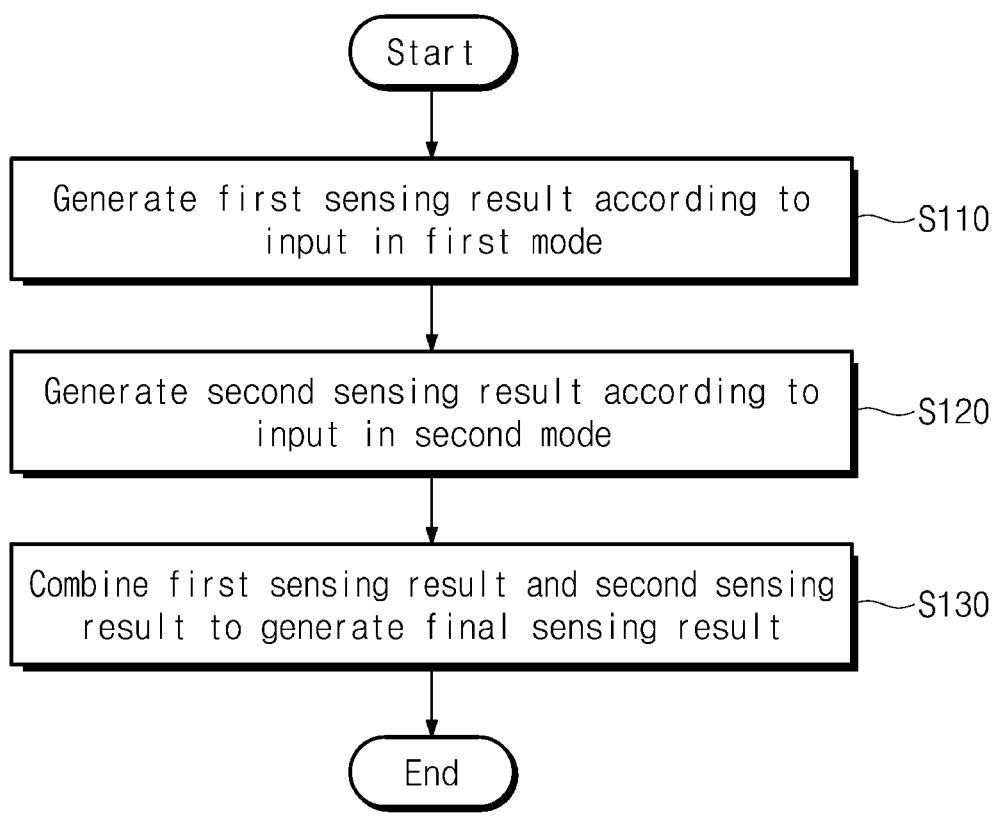
FIG. 13 is a flowchart showing a method of driving a display device according to an embodiment of the present disclosure.
Figure 14A:
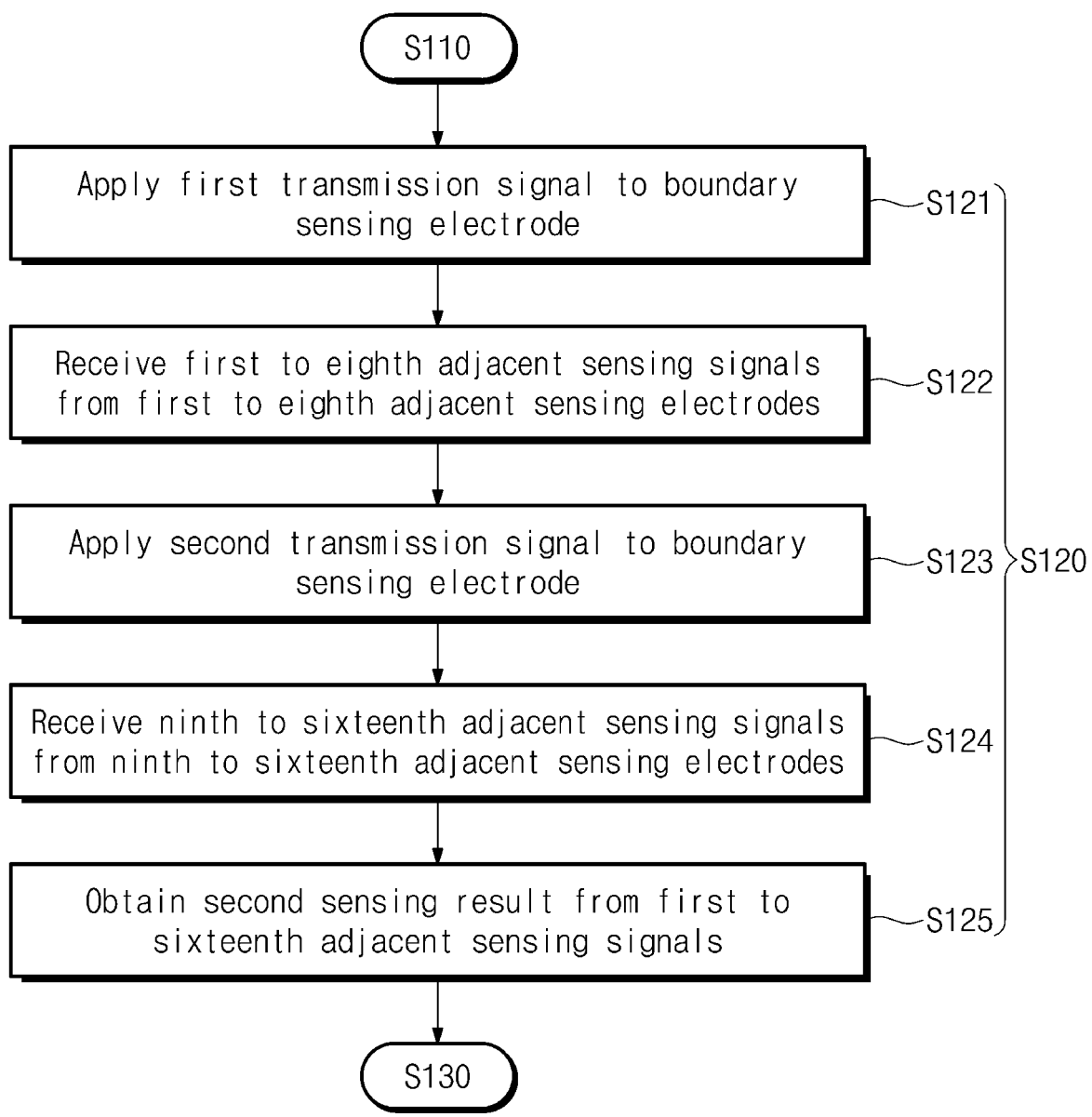
FIGS. 14A to 14C are flowcharts showing an operation in an second mode shown in FIG. 13.
Figure 14B:
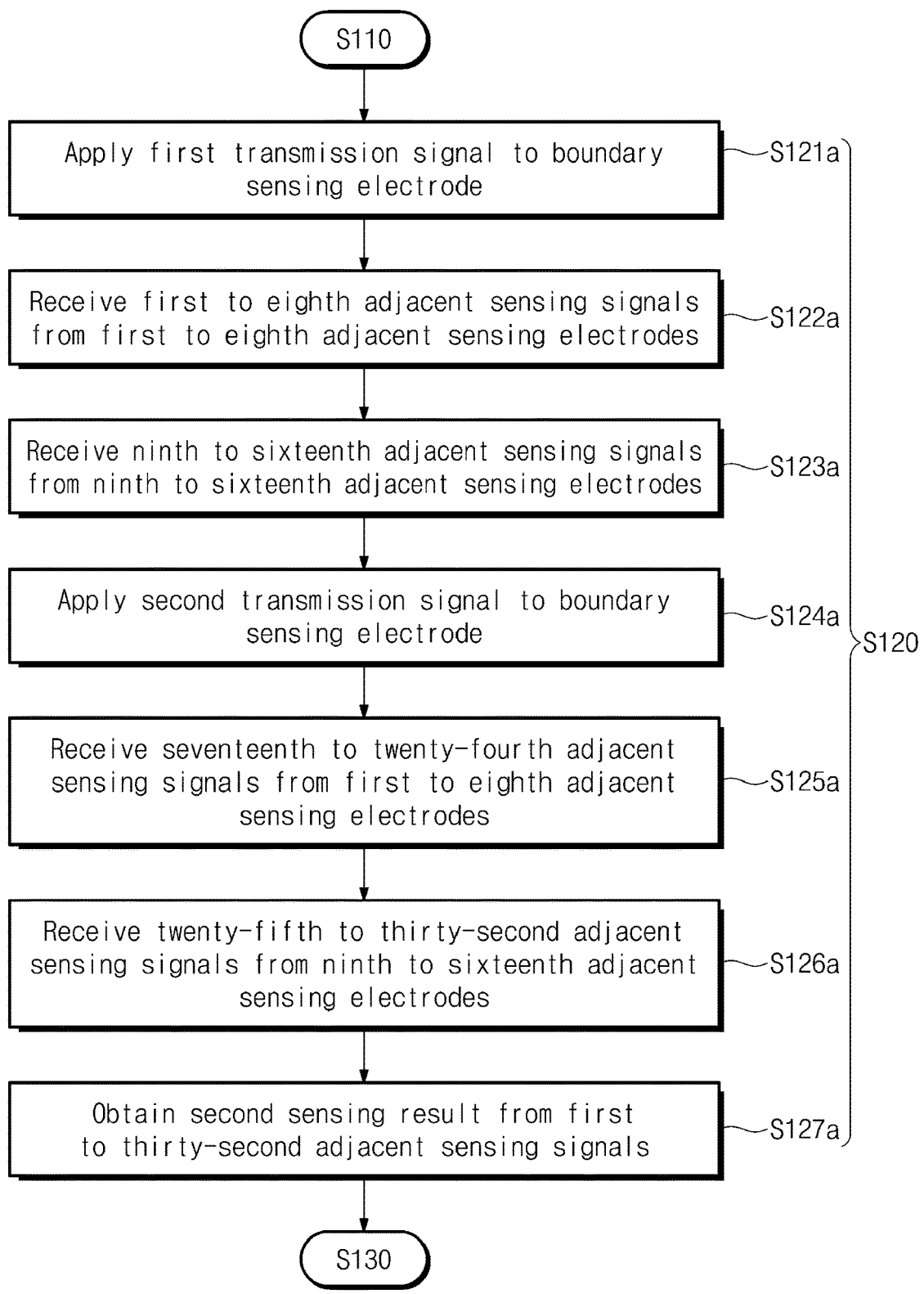
Figure 14C:
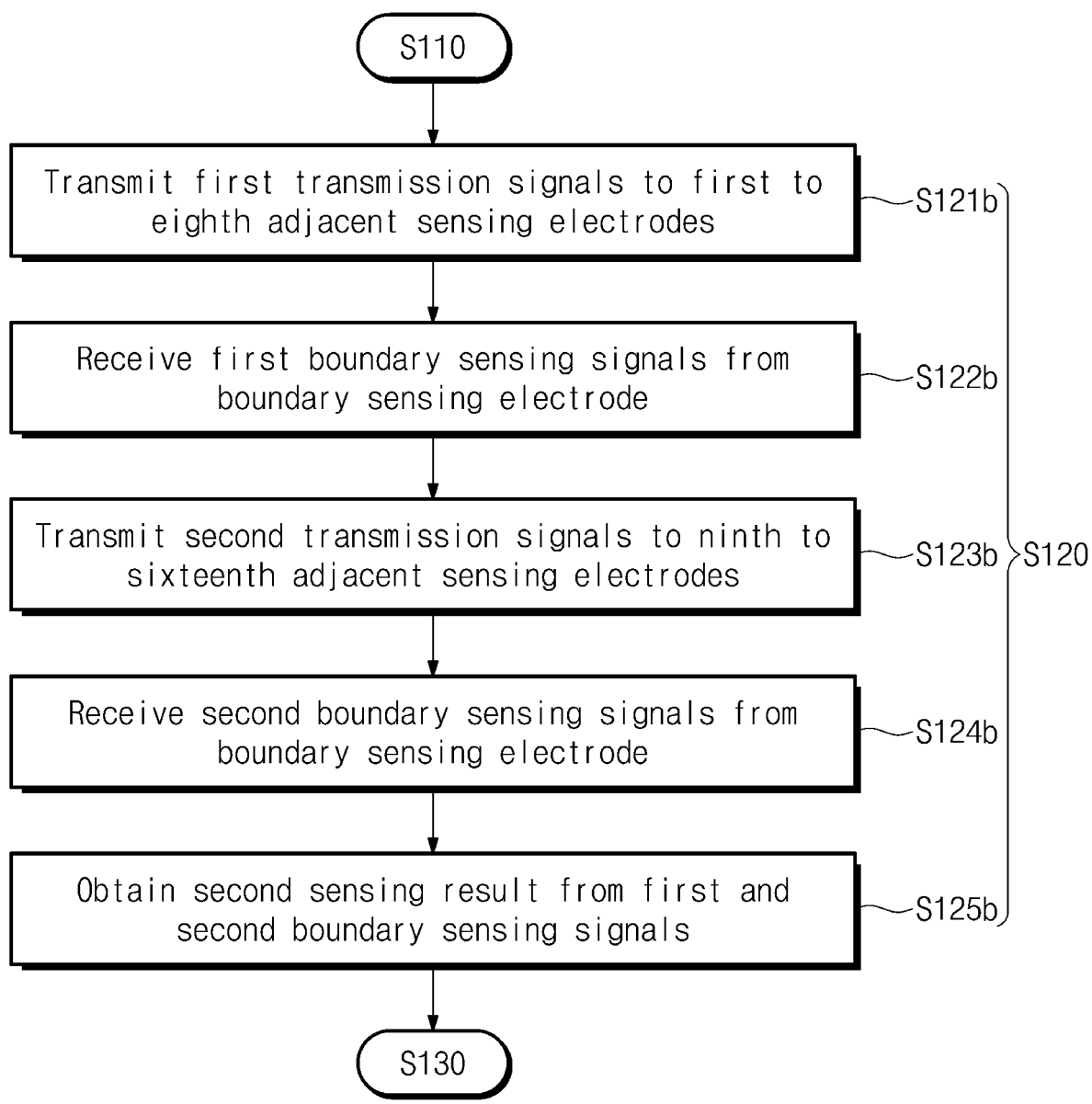

FIG. 13 is a flowchart showing a method of driving the display device according to an embodiment of the present disclosure, and FIGS. 14A to 14C are flowcharts showing an operation of the display device in a second mode shown in FIG. 13.

Referring to FIGS. 3, 4, and 13, the display device DD may include the display panel DP configured to display: the image, the input sensor ISP disposed on the display panel DP configured to sense an input, and the first and second sensor control circuits TIC1 and TIC2 connected to the input sensor ISP. The display device DD may sense the input using the input sensor ISP. The display device DD may generate a first sensing result according to the input in the first mode (S110). The first sensing result, which is generated during the first mode, may include a first self-sensing result and a second self-sensing result. The first self-sensing result may be obtained by driving the first sensing electrodes SE1 disposed in the first area A1 of the input sensor ISP in the self-capacitance method using the first sensor control circuit TIC1. The second self-sensing result may be obtained by driving the second sensing electrodes SE2 disposed in the second area A2 in the self-capacitance method using the second sensor control circuit TIC2.

The display device DD may generate a second sensing result according to the input in the second mode (S120). For example, the second sensing result may include the first mutual sensing result and the second mutual sensing result. The first mutual sensing result may be obtained by driving the boundary sensing electrode BSE and some of the first sensing electrodes SE1 of the input sensor ISP in the mutual capacitance method using the first sensor control circuit TIC1. For example, the first mutual sensing result may be obtained by driving the boundary sensing electrode BSE, as well as first sensing electrodes SE1 which are disposed adjacent to the boundary sensing electrode BSE in a first area. The second mutual sensing result may be obtained by driving the boundary sensing electrode BSE and some of the second sensing electrodes SE2 of the input sensor ISP in the mutual capacitance method using the second sensor control circuit TIC2. For example, the second mutual sensing result may be obtained by driving the boundary sensing electrode BSE, as well as second sensing electrodes SE2 which are disposed adjacent to the boundary sensing electrode BSE in a second area.

Then, the display device DD may combine the first sensing result in the first mode and the second sensing result in the second mode to obtain the final sensing result (S130).

Hereinafter, the operation in the second mode will be described in detail with reference to FIGS. 14A to 14C.

Referring to FIGS. 6A, 6B, 13, and 14A, the first sensor control circuit TIC1 may apply the first transmission signal TS1 to the boundary sensing electrode BSE during the first part of the second mode (S121). Then, the boundary sensing electrode BSE may form the first through eighth mutual capacitors Cm11 through Cm18 with the first through eighth adjacent sensing electrodes SE1_61 through SE1_68, respectively. The first sensor control circuit TIC1 may sequentially receive the first through eighth adjacent sensing signals RS1_1, through RS1_8 from the first through eighth adjacent sensing electrodes SE1_61 through SE1_68 (S122). From this process, an embodiment of the present input sensor may generate a first mutual sensing result.

The second sensor control circuit TIC2 may apply the second transmission signal TS2 to the boundary sensing electrode BSE during the second part of the second mode (S123). The boundary sensing electrode BSE may form the ninth through sixteenth mutual capacitors Cm21 through Cm28 with the ninth through sixteenth adjacent sensing electrodes SE2_71 through SE2_78, respectively. The second sensor control circuit TIC2 may sequentially receive the ninth through sixteenth adjacent sensing signals RS2_1 through RS2_8 from the ninth through sixteenth adjacent sensing electrodes SE2_71 through SE2_78 (S124). From this process, an embodiment of the present input sensor may generate a second mutual sensing result.

The display device DD may obtain the second sensing result with respect to the input from the first through eighth adjacent sensing signals RS1_1 through RS1_8 and the ninth through sixteenth adjacent sensing signals RS2_1 through RS2_8 (S125). As an example, the second sensing result may include the first mutual sensing result and the second mutual sensing result. The first sensor control circuit TIC1 may obtain the first mutual sensing result with respect to the input from the first through eighth adjacent sensing signals RS1_1 through RS1_8, and the second sensor control circuit TIC2 may obtain the second mutual sensing result with respect to the input from the ninth through sixteenth adjacent sensing signals RS2_1 through RS2_8 (S125).

The final sensing result may include and/or be determined from the first final sensing result and the second final sensing result. The first sensor control circuit TIC1 may combine the first self-sensing result in the first mode and the first mutual sensing result in the second mode to generate the first final sensing result. The second sensor control circuit TIC2 may combine the second self-sensing result in the first mode and the second mutual sensing result in the second mode to generate the second final sensing result.

Referring to FIGS. 7A, 7B, 13, and 14B, the first sensor control circuit TIC1 may apply the first transmission signal TSa to the boundary sensing electrode BSE during the first part of the second mode (S121a). The boundary sensing electrode BSE may form the first through eighth mutual capacitors Cm11 through Cm18 with the first through eighth adjacent sensing electrodes SE1_61 through SE1_68. The boundary sensing electrode BSE may form the ninth through sixteenth mutual capacitors Cm21 through Cm28 with the ninth through sixteenth adjacent sensing electrodes SE2_71 through SE2_78. The first sensor control circuit TIC1 may sequentially receive the first through eighth adjacent sensing signals RSa_1 through RSa_8 from the first through eighth adjacent sensing electrodes SE1_61 through SE1_68 (S122a). The second sensor control circuit TIC2 may sequentially receive the ninth through sixteenth adjacent sensing signals RSa_9 through RSa_16 from the ninth through sixteenth adjacent sensing electrodes SE2_71 through SE2_78 (S123a). From this process, an embodiment of the present input sensor may generate a first mutual sensing result.

During the second part of the second mode, the second sensor control circuit TIC2 may apply the second transmission signal TSb to the boundary sensing electrode BSE (S124a). Then, the boundary sensing electrode BSE may form the first through eighth mutual capacitors Cm11 through Cm18 with the first through eighth adjacent sensing electrodes SE1_61 through SE1_68 and may form the ninth through sixteenth mutual capacitors Cm21 through Cm28 with the ninth through sixteenth adjacent sensing electrodes SE2_71 through SE2_78. After that, the first sensor control circuit TIC1 may sequentially receive the seventeenth through twenty-fourth adjacent sensing signals RSb_1 through RSb_8 from the first through eighth adjacent sensing electrodes SE1_61 through SE1_68 (S125a). The second sensor control circuit TIC2 roast sequentially receive the twenty-fifth through thirty-second adjacent sensing signals RSb_9 through RSb_16 from the ninth through sixteenth adjacent sensing electrodes SE2_71 through SE2_78 (S126a). From this process, an embodiment of the present input sensor may generate a second mutual sensing result.

The display device DD may obtain the second sensing result with respect to the input from the first through thirty-second adjacent sensing signals RSa_1 through RSa_16 and RSb_1 through RSb_16 (S127a). As an example, the second sensing result may include the first and second mutual sensing results. The first sensor control circuit TIC1 may obtain the first mutual sensing result with respect to the input from the first through eighth adjacent sensing signals RSa_1 through RSa_8 and the seventeenth through twenty-fourth adjacent sensing signals RSb_1 through RSb_8. The second sensor control circuit TIC2 may obtain the second mutual sensing result with respect to the input from the ninth through sixteenth adjacent sensing signals RSa_9 through RSa_16 and twenty-fifth through thirty-second adjacent sensing signals RSb_9 through RSb_16.

The final sensing result may include and/or be determined from the first final sensing result and the second final sensing result. The first sensor control circuit TIC1 may combine the first self-sensing result in the first mode and the first mutual sensing result in the second mode to generate the first final sensing result. The second sensor control circuit TIC2 may combine the second self-sensing result in the first mode and the second mutual sensing result in the second mode to generate the second final sensing result.

Referring to FIGS. 8A, 8B, 13, and 14C, the first sensor control circuit TIC1 may sequentially apply the first transmission signals TS1_1 through TS1_8 to the first through eighth adjacent sensing electrodes SE1_61 through SE1_68 during the first part of the second mode (S121b). Then, the boundary sensing electrode BSE may sequentially form the first through eighth mutual capacitors Cm11 through Cm18 with the first through eighth adjacent sensing electrodes SE1_61 through SE1_68. After that, the first sensor control circuit TIC1 may sequentially receive the first boundary sensing signals BRS1_1 through BRS1_8, which are determined to correspond to the first transmission signals TS1_1 through TS1_8, respectively, from the boundary sensing electrode BSE (S122b). From this process, an embodiment of the present input sensor may generate a first mutual sensing result.

Next, the second sensor control circuit TIC2 may sequentially transmit the second transmission signals TS2_1 through TS2_8 to the ninth through sixteenth sensing electrodes SE2_71 through SE2_78 during the second part of the second mode (S123b). Accordingly, the boundary sensing electrode BSE may sequentially form the ninth through sixteenth mutual capacitors Cm21 through Cm28 with the ninth through sixteenth adjacent sensing electrodes SE2_71 through SE2_78. Next, the second sensor control circuit TITIC2 may receive the second boundary sensing signals BRS2_1 through BRS2_8, which are determined to correspond to the second transmission signals TS2_1 through TS2_8, respectively, from the boundary sensing electrode BSE (S124b). From this process, an embodiment of the present input sensor may generate a second mutual sensing result.

The display device DD may obtain the second sensing result with respect to the input from the first and second boundary sensing signals BRS1_1 through BRS1_8 and BRS2_1 through BRS2_8 (S125b). As an example, the second sensing result may include the first and second mutual sensing results. In detail, the first sensor control circuit TIC1 may obtain the first mutual sensing result with respect to the input from the first boundary sensing signals BRS1_1 through BRS1_8, and the second sensor control circuit TIC2 may obtain the second mutual sensing result with respect to the input from the second boundary sensing signals BRS2_1 through BRS2_8.

The final sensing result may include and/or be determined by the first final sensing result and the second final sensing result. The first sensor control circuit TIC1 may combine the first self-sensing result obtained from the first sensing electrodes SE1 in the first mode and the first mutual sensing result obtained from the boundary sensing electrode BSE in the second mode to generate the first final sensing result. The second sensor control circuit TIC2 may combine the second self-sensing result obtained from the second sensing electrodes SE2 in the first mode and the second mutual sensing result obtained from the boundary sensing electrode BSE in the second mode to generate the second final sensing result.

As described above, the input sensor ISP according to the present disclosure may sense the input occurring in the boundary by two sensing methods, e.g., the self-capacitance method and the mutual capacitance method, using the boundary sensing electrode BSE disposed in the boundary between the first and second areas A1 and A2, and thus, the sensing characteristics in the boundary may be improved.

Although the embodiments of the present disclosure have been described, it is understood that the present disclosure should not necessarily be limited to these embodiments, and that various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the following claims.

What is claimed is:

1. A display device comprising:
   a display panel configured to display an image;
   an input sensor disposed on the display panel and configured to sense an input, wherein the input sensor comprises a first area and a second area; and
   a sensor controller connected to the input sensor, wherein the input sensor further comprises:
      first sensing electrodes disposed in the first area;
      second sensing electrodes disposed in the second area; and
      a boundary sensing electrode overlapping a boundary between the first and second areas, wherein the boundary sensing electrode forms a mutual capacitor with one or more of the first sensing electrodes that are adjacent to the boundary sensing electrode, and forms a mutual capacitor with one or more of the second sensing electrodes that are adjacent to the boundary sensing electrode, wherein the sensor controller comprises a first sensor control circuit electrically connected to the first sensing electrodes and a second sensor control circuit electrically connected to the second sensing electrodes, and wherein the first sensor control circuit drives the first sensing electrodes to sense the input using self-capacitance in a first mode, and the second sensor control circuit drives the second sensing electrodes to sense the input using the self-capacitance in the first mode, and wherein one of the first and second sensor control circuits drives the one or more of the first sensing electrodes and one or more of the second sensing electrodes using mutual capacitance with the boundary sensing electrode in a second mode.

2. The display device of claim 1, wherein the first sensor control circuit drives the one or more of the first sensing electrodes adjacent to the boundary sensing electrode and the boundary sensing electrode to sense the input in the second mode, and the second sensor control circuit drives the one or more of the second sensing electrodes adjacent to the boundary sensing electrode and the boundary sensing electrode to sense the input in the second mode.

3. The display device of claim 2, wherein the boundary sensing electrode is electrically connected to the first and second sensor control circuits.

4. The display device of claim 3, wherein:
   the first sensor control circuit applies a first transmission signal to the boundary sensing electrode and receives first sensing signals from the one or more first sensing electrodes adjacent to the boundary sensing electrode during a first part of the second mode, and
   the second sensor control circuit applies a second transmission signal to the boundary sensing electrode and receives second sensing signals from the one or more second sensing electrodes adjacent to the boundary sensing electrode during a second part of the second mode.

5. The display device of claim 3, wherein:
   the first sensor control circuit applies a first transmission signal to the boundary sensing electrode and receives first sensing signals from the one or more first sensing electrodes adjacent to the boundary sensing electrode during a first part of the second mode,
   the second sensor control circuit receives second sensing signals from the one or more second sensing electrodes adjacent to the boundary sensing electrode during the first part of the second mode,
   the second sensor control circuit applies a second transmission signal to the boundary sensing electrode during a second part of the second mode,
   the first sensor control circuit receives third sensing signals from the one or more first sensing electrodes adjacent to the boundary sensing electrode during the second part of the second mode, and
   the second sensor control circuit receives fourth sensing signals from the one or more second sensing electrodes adjacent to the boundary sensing electrode during the second part of the second mode.

6. The display device of claim 3, wherein:
   the first sensor control circuit sequentially transmits first transmission signals to the one or more first sensing electrodes adjacent to the boundary sensing electrode and receives first boundary sensing signals from the boundary sensing electrode during a first part of the second mode, and
   the second sensor control circuit sequentially transmits second transmission signals to the one or more second sensing electrodes adjacent to the boundary sensing electrode and receives second boundary sensing signals from the boundary sensing electrode during a second part of the second mode.

7. The display device of claim 1, wherein at least one of the first and second sensor control circuits applies a compensation signal to the boundary sensing electrode in the first mode.

8. The display device of claim 7, wherein the compensation signal has a same phase as a first driving signal applied to the first sensing electrodes by the first sensor control circuit and a second driving signal applied to the second sensing electrodes by the second sensor control circuit.

9. The display device of claim 1, wherein the first and second areas are adjacent to each other in a first direction, and the boundary sensing electrode extends in a second direction crossing the first direction.

10. The display device of claim 9, wherein the boundary sensing electrode is disposed between the one or more first sensing electrodes adjacent to the boundary sensing electrode and the one or more second sensing electrodes adjacent to the boundary sensing electrode in the first direction.

11. The display device of claim 10, wherein a first distance in the first direction between two first sensing electrodes adjacent to each other among the first sensing electrodes is equal to a second distance in the first direction between two second sensing electrodes adjacent to each other among the second sensing electrodes, and a third distance in the first direction between the one or more first sensing electrodes adjacent to the boundary sensing electrode and the one or more second sensing electrodes adjacent to the boundary sensing electrode is equal to or greater than the first and second distances.

12. The display device of claim 9, wherein the input sensor further comprises:
- first sensing lines extending in the second direction and electrically connecting the first sensing electrodes to the sensor controller; and
- second sensing lines extending in the second direction and electrically connecting the second sensing electrodes to the sensor controller.

13. The display device of claim 12, wherein the input sensor further comprises:
- a base insulating layer; and
- a sensing insulating layer disposed on the base insulating layer, the first and second sensing lines are disposed on the base insulating layer, and the first and second sensing electrodes are disposed on the sensing insulating layer overlapping the first and second sensing lines in a thickness direction of the base insulating layer.

14. The display device of claim 12, wherein each of the first sensing lines overlaps at least one first sensing electrode, each of the second sensing lines overlaps at least one second sensing electrode, and each of the first and second sensing lines does not overlap the boundary sensing electrode.

15. A method of driving a display device comprising a display panel configured to display an image, an input sensor disposed on the display panel configured to sense an input, and first and second sensor control circuits connected to the input sensor, the method comprising:
- driving first sensing electrodes disposed in a first area of the input sensor using the first sensor control circuit and driving second sensing electrodes disposed in a second area of the input sensor using the second sensor control circuit to generate a first sensing result corresponding to the input in a first mode wherein the first mode corresponds to driving the first sensing electrodes and second sensing electrodes using self-capacitance;
- driving a boundary sensing electrode overlapping a boundary between the first and second areas of the input sensor, one or more of the first sensing electrodes adjacent to the boundary sensing electrode, and one or more of the second sensing electrodes adjacent to the boundary sensing electrode to generate a second sensing result corresponding to the input in a second mode, wherein the second mode corresponds to driving the one or more adjacent first sensing electrodes and one or more second sensing electrodes using mutual capacitance with the boundary sensing electrode; and
- combining the first sensing result in the first mode and the second sensing result in the second mode to obtain a final sensing result.

16. The method of claim 15, wherein:
- the first sensor control circuit applies a first transmission signal to the boundary sensing electrode and receives first sensing signals from one or more of the first sensing electrodes adjacent to the boundary sensing electrode during a first part of the second mode, and
- the second sensor control circuit applies a second transmission signal to the boundary sensing electrode and receives second sensing signals from one or more of the second sensing electrodes adjacent to the boundary sensing electrode during a second part of the second mode.

17. The method of claim 15, wherein:
- the first sensor control circuit applies a first transmission signal to the boundary sensing electrode and receives first sensing signals from one or more of the first sensing electrodes adjacent to the boundary sensing electrode during a first part of the second mode,
- the second sensor control circuit receives second sensing signals from one or more of the second sensing electrodes adjacent to the boundary sensing electrode during the first part of the second mode, the second sensor control circuit applies a second transmission signal to the boundary sensing electrode during a second part of the second mode,
- the first sensor control circuit receives third sensing signals from the one or more first sensing electrodes adjacent to the boundary sensing electrode during the second part of the second mode, and
- the second sensor control circuit receives fourth sensing signals from the one or more second sensing electrodes adjacent to the boundary sensing electrode during the second part of the second mode.

18. The method of claim 15, wherein:
- the first sensor control circuit sequentially transmits first transmission signals to one or more of the first sensing electrodes adjacent to the boundary sensing electrode and receives first boundary sensing signals from the boundary sensing electrode during a first part of the second mode, and
- the second sensor control circuit sequentially transmits second transmission signals to one or more of the second sensing electrodes adjacent to the boundary sensing electrode and receives second boundary sensing signals from the boundary sensing electrode during a second part of the second mode.

* * * * *